United States Patent [19]

Acampora

[11] Patent Number: 4,700,226
[45] Date of Patent: Oct. 13, 1987

[54] RATE BUFFER CONTROL OF PREDICTED SIGNAL DECIMATION AND INTERPOLATION FOR ADAPTIVE DIFFERENTIAL PULSE CODE MODULATOR

[75] Inventor: Alfonse A. Acampora, Staten Island, N.Y.

[73] Assignee: RCA Corporation, Princeton, N.J.

[21] Appl. No.: 920,294

[22] Filed: Oct. 17, 1986

[51] Int. Cl.[4] .................. H04N 7/137; H04B 14/06
[52] U.S. Cl. ..................................... 358/136; 375/27
[58] Field of Search .................. 358/136, 135, 133, 13; 375/27

[56] References Cited

U.S. PATENT DOCUMENTS

| | | | |
|---|---|---|---|
| 3,769,451 | 10/1973 | Connor | 358/135 |
| 4,460,923 | 7/1984 | Hirano et al. | 358/136 |
| 4,488,175 | 12/1984 | Netravali | 358/136 |
| 4,541,012 | 9/1985 | Tescher | 358/133 |
| 4,551,753 | 11/1985 | Nishizawa et al. | 358/140 |
| 4,562,468 | 12/1985 | Koga | 358/136 |
| 4,568,965 | 2/1986 | Powers | 358/11 |
| 4,591,908 | 5/1986 | Hirano | 358/136 |
| 4,604,720 | 8/1986 | Stikvoort | 364/724 |
| 4,607,281 | 8/1986 | Starck | 358/136 |

FOREIGN PATENT DOCUMENTS 59-123383  7/1984  Japan .

OTHER PUBLICATIONS

Article entitled "Picture Coding: A Review" by Netravali et al., published at pp. 366-407 of the Proceedings of the IEEE, vol. 68, No. 3, Mar. 1980.

Primary Examiner—Howard W. Britton
Attorney, Agent, or Firm—Allen L. Limberg; Henry I. Steckler; William H. Meise

[57] ABSTRACT

A predictive coding signal communication arrangement includes, at the transmitter, a subtractor for subtracting delayed predicted signals from current input signals to produce difference signals. Predicted signals are generated by adding the difference signals to the delayed predicted signals, and delay of the predicted signals produces the delayed predicted signals. The difference signals are also applied to a coder for Huffman coding, run-length coding, or the like, and then to a rate buffer for reducing data rate variability. In order to prevent overflow of the rate buffer, a control signal is generated which represents the level to which the rate buffer is filled. The control signal is used to control the data rate reduction or decimation of the current input signals. The decimation of the current input signal produces a data rate disparity, which is corrected by a similar decimation of the delayed predicted signal, and an inverse interpolation or data rate increase of the current predicted signal. Anti-alias and ghost reduction filters are also controlled by the control signal. The ghost reduction filters are switched after a period of time.

26 Claims, 16 Drawing Figures

RATE BUFFER CONTROL OF PREDICTED SIGNAL DECIMATION AND INTERPOLATION FOR ADAPTIVE DIFFERENTIAL PULSE CODE MODULATOR

This invention relates to differential pulse code modulation (DPCM) data rate reduction systems, and more particularly to the use of adaptive decimation for control of the data rate.

BACKGROUND OF THE INVENTION

The transmission of television signals in our society is widespread. The type of television transmission most familiar to the public is conventional broadcast television which occurs on VHF and UHF television channels. These television channels each have an assigned bandwidth of 6 megahertz (MHz). In some areas of the country, it would be desirable to have additional channel capacity available, as by the use of narrower channel bandwidth. While it is technologically feasible to significantly reduce the bandwidth required for conventional television broadcasting by modern coding methods, the enormous cost of changing millions of television receivers to accommodate this coding is prohibitive.

In addition to terrestrial broadcast, there are many other uses of broadcast or point-to-point transmitted television in our society. For example, international satellite television links transmit live programs around the world, television networks distribute network programming to their affiliates, and weather and earth-resource satellites transmit television signals representing their pictures. Furthermore, video teleconferencing and facsimile transmission of newspapers and printed material is receiving increasing attention. In many of these applications, it is highly desirable to reduce the required transmission bandwidth or data rate to the minimum possible, in order that a satellite or other transmission link may carry the maximum number of individual television pictures. A large body of art has arisen which is directed toward schemes for coding television signals to take advantage of the redundancy of the television signals in various manners for data rate reduction, as described for example in the article "Picture Coding: A Review" by Netravali et al., published at pages 366–406 of the proceedings of the IEEE, Volume 68, No. 3, March 1980.

According to Netravali, in addition to pulse code modulation (PCM), coding is classified in the major categories of (a) transform coding, (b) interpolate/extrapolate coding, (c) predictive coding and (d) miscellaneous coding. Pulse oode modulation merely transforms the television signal into a digital signal, which in general is not a bandwidth efficient code. Transform coding breaks the television signal into blocks of data which may be considered to be subpictures, and represents the subpictures as linear combinations of certain standard subpictures. The proportion of each standard picture is termed a coefficient. The interpolate/extrapolate coder attempts the send certain samples to the receiver and to either interpolate or extrapolate the remainder of the samples. The miscellaneous schemes include conditional replenishment, in which individual line element sample signals from a successive field of information are compared with the corresponding line elements in the previous field, and the difference therebetween is tested against a fixed threshold. If the difference exceeds the threshold value the new value is encoded and transmitted to a receiving station, along with an appropriate address code, as described in U.S. Pat. No. 4,541,012 issued Sept. 10, 1985, to Tescher. In general, conditional replenishment techniques are not optimum because the addresses of the transmitted samples must be transmitted.

The predictive coding technique is effective for reducing the data rate. In predictive coding, the transmitter generates an error signal for transmission to the receiver which represents the difference between a current data word representing a picture element (pixel or pel) which the transmitter is receiving and a reference or "predicted" data word representing a pixel which is generated by the receiver. It should be noted that the word "pixel" is often used to denote the data word representing a pixel or the value of the data word by which a pixel is represented. The transmitter knows the value of the predicted data word or pixel in a predictive coding system, because the transmitter includes a prediction circuit which is identical to the prediction circuit in the receiver which is producing the predicted pixel. The predicted reference pixel is often a corresponding pixel from a previous frame, or a weighted linear combination of pixels lying near the corresponding pixel of either the current or the previous frame. In this context, "near" means close physical proximity in the two-dimensional picture or raster of which the pixels are a part.

FIG. 1 illustrates in block diagram form a communication system using predictive coding techniques. In FIG. 1, a transmitter 10 communicates by way of a narrow bandwidth data channel 30 with a receiver 38. Transmitter 10 includes a source 12 of frame-sequential, line-scanned analog television signals which applies the analog television signals to an analog-to-digital converter (ADC) 14. ADC 14 samples the analog signals, quantizes them (represents the infinite range of values by a finite set of values) and digitizes them (represents each value of the set by a different digital number) to form digital signals which are made available on a conductor 15. Those skilled in the art understand that digital signals may be in either serial or parallel form, and that serial digital signals may be carried on a single conductor (together with its associated ground), while parallel signals must be carried by a set (a plurality) of conductors. Since this is well known, no distinction is made hereinafter between single conductors and sets of conductors. The digital signals produced by ADC 14 on conductor 15 are applied to the noninverting (+) input terminal of a subtracting circuit or subtractor 16 which receives a delayed predicted signal from conductor 25 at its inverting (−) input terminal. The predicted signal applied to the inverting input terminal of subtractor 16 is subtracted from the current value of the signal then being applied to the noninverting input terminal of adder 16 from conductor 15. A difference signal is generated at the output of subtractor 16. The difference signal is often known as an error signal. Since ADC 14 quantized the signal, the error signal at the output of subtractor 16 is also quantized. While not absolutely necessary to an understanding of predictive coding systems and not essential to operation of predictive coding systems generally or to operation of predictive coding systems according to the invention, a coarse quantizer illustrated as a block 18 is often coupled to the output of subtractor 16 to coarsely quantize the difference signal into a number of "bins". The bin is itself represented by a digital number, so the output of quantizer 18 on conductor 19 is a quantized difference signal, just as is the signal on conductor 17. The term difference (or error) signal hereinafter refers to the difference (error) signal on either conductors 17 or 19, without regard to the magnitude of the quantizing steps.

The difference or error signal on conductor 19 is applied to a predictor loop designated generally as 20. Predictor loop 20 is a replica of the circuit 40 in receiver 38 which regenerates each pixel to be displayed in succession from the signal transmitted over channel 30. Predictor loop 20 includes a summer or adder 22 which receives the difference or error signal from conductor 19. Adder 22 adds to the difference or error signal the delayed value of the predicted signal to produce a new predicted signal which is made available on a conductor 23 to a predictor and delay circuit 24. Predictor and delay circuit 24 delays the new predicted signal for a predetermined length of time, and may perform other processing steps, as mentioned, such as averaging together nearby pixels. For example, the delay associated with predictor and delay circuit 24 can be one frame interval. A delay magnitude of one frame interval indicates that the intensity value of a pixel of a frame is generally expected to be the same as the value of the corresponding pixel of the preceding frame. For a still picture, this will be true for every pixel Even in a picture having some motion, it will be true for many pixels. The new value of the predicted signal appearing on conductor 23 is a current predicted signal, which is delayed by the frame interval in predictor delay circuit 24 to become a delayed predicted signal on conductor 25. The delayed predicted signal on conductor 25 is applied to the inverting input terminal of subtractor 16 and to the input terminal of adder 22, as mentioned. As described, each pixel is characterized by a single value, which may be considered to be the luminance of a monochrome (black-and-white) picture. Those skilled in the art will realize that it may also represent the intensity of any one of a plurality of components of a color signal.

The difference or error signal on conductor 19 is also applied to a coding circuit illustrated as a coder 26. Coder 26 encodes the difference signal in known fashion, as by run length coding and/or Huffman coding. Run length coding and Huffman coding have the effect of drastically reducing the data rate, and also cause the data rate to be variable. In order to eliminate the variability of the data rate, a rate buffer 28 is coupled to coder 26 for receiving or being laden with coded difference data at a variable rate, for temporarily storing the coded difference data, and for applying the coded difference data at a constant rate through channel 30 to receiver 38. This type of buffer is often known as a first-in, first-out (FIFO) memory.

Receiver 38 receives coded difference data at a constant rate from channel 30, and stores the coded difference data in a rate buffer 48. Data is supplied therefrom as required to a decoder 46, which accepts the run length and Huffman-coded difference data at a variable rate, and decodes it into difference or error signals available on conductor 59, exactly corresponding to the signals which were available on conductor 19 of transmitter 10 (except for transmission errors, which are not considered herein). The decoded difference or error signals are applied to an input terminal of a summer or adder 42 of a predictor loop designated generally as 40. Adder 42 adds together the difference or error signal appearing on conductor 59 and the delayed predicted signal appearing on conductor 45, to produce a new predicted signal on a conductor 43, which is applied to a digital-to-analog converter (DAC) 54 for generating an analog signal, which is applied to a television display circuit illustrated as a block 52 for display of the picture. The new predicted signal is also applied from conductor 43 to a predictor and delay circuit 44 which is identical to predictor and delay circuit 24 of transmitter 10. Since predictor and delay circuit 44 is identical to predictor and delay circuit 24, the new predicted signal on conductor 43 appears on conductor 45 after a corresponding delay, which in the example is one frame interval. The resulting delayed predicted signal on conductor 45 is applied to adder 42, as mentioned.

The signal on conductor 19 of transmitter 10 and the signal on conductor 59 of receiver 38 are identical (except for a time lag due to the time required for transmission therebetween), because decoder 46 performs a transformation which is the precise inverse of that performed by coder 26. Difference signals applied by conductor 19 to adder 22 are therefore identical to the signals applied from conductor 59 to adder 42, and since predictor 20 is identical to predictor 40, the new predicted signals produced on conductors 23 and 43 are identical, except for the transmission time lag (which has no significant effect, and is hereinafter ignored). Since predictor and delay circuits 24 and 44 are identical, and each receives the new predicted signal at its input, each produces identical delayed predicted signals on its output conductor (25 and 45). Thus, transmitter 10 produces on conductor 23 a signal identical to that which receiver 38 currently produces for display. For this purpose, the term "currently" does not refer to concurrence in time, but rather to concurrence of television frame number and raster position. Consequently, transmitter 10 always has available to it at the inverting input of subtractor 16 a delayed predicted signal identical to that generated by receiver 38 for the corresponding pixel of the previous frame. Therefore, the error signal being transmitted at any moment from transmitter 10 is the difference between the television signal then being applied on conductor 15 to subtractor 16, from which is subtracted a signal corresponding to that produced and displayed by receiver 38 for the previous frame. It should be noted that during system design experimentation relating to predictor and quantizer effects, a receiver 38 may not be used; the signal on conductor 23 of the transmitter is considered to be a replica of the signal produced on conductor 43 by such a receiver.

Predictive systems such as that illustrated in FIG. 1 can achieve very large reductions in data rate, especially on still pictures. However, when the picture has motion, the predicted signal may at times be most unlike the actual current value. When there is substantial motion in the television picture, the difference or error signals on conductor 19 tend to be large in value and to change rapidly. Consequently, run length coding tends to be relatively less effective in reducing data rate, and Huffman coding tends to produce relatively longer code words. Since the data rate of channel 30 is preestablished and rate buffer 28 of transmitter 10 can only transmit data at the maximum rate allowed by channel 30, it is possible for rate buffer 28 to become overfull or to "overflow" when the average size of the code word length is large, and code words are applied to the rate buffer for a long period of time at a high rate. The term "overfull" and "overflow," may not be sufficiently descriptive. The rate buffer is "laden" or loaded by the difference between the variable flow of code words into the buffer and the fixed flow of code words out of the buffer, which forms a "lading" or loading which varies with time. The capacity of the buffer is the maximum lading which it can hold. The lading may from moment to moment vary from zero (empty buffer) to the maximum capacity of the buffer (corresponding to a full buffer). Any attempt to increase the lading, even by one bit, creates an "overflow" condition. "Underflow" occurs when the buffer writes or attempts to write to the outside world a number of bits which exceeds the number of bits in the lading, with the result that meaningless zero values are transmitted as meaningful data. When the lading is such that underflow or overflow occurs, some code words may not be stored in rate buffer 28, or are corrupted, and are therefore lost. The loss or corruption of code words is very serious in a predictive encoding type of communication system, and leads to substantial errors in data transmission and consequent distortions of the transmitted picture.

It should be noted that the quantizer (18) in these loops is recognized as being a nonlinear element, which makes rigorous analysis difficult. Furthermore, the quantizer may have quantizing steps of different sizes, which increases the nonlinearity. However, ignoring the nonlinearity in the analysis produces results which, while not rigorous, indicate trends, and which can therefore be useful.

A known method for stabilizing the lading of the rate buffer (and therefore preventing exceeding the capacity of the buffer by underflow or overflow) is to sense the amount of lading of the rate buffer, and to generate a control signal which is applied to at least one of the elements of the predictive coding system which produces the coded difference signal to reduce the rate of generation of the code words when the control signal indicates that the buffer is above or below a certain lading level.

FIG. 2 illustrates a predictive encoding system similar to FIG. 1 The arrangement of FIG. 2 differs from the arrangement of FIG. 1 in that a fill control circuit illustrated as a block 210 is coupled to rate buffer 28 in transmitter 110 for producing a control signal on a conductor 212 representing the occupancy (level of fill or lading level) of rate buffer 58. The control signal on conductor 212 is applied to a decimator illustrated as a block 214, which is connected by conductors 15 and 15' between ADC 14 and the noninverting input terminal of subtractor 16. Decimator 214 is intended to reduce the data rate by decimating pixels, lines or frames. In this context, decimation means deletion of a proportion of the total number of pixels, lines or frames. For purposes of explanation, the description hereinafter assumes that pixels are being decimated. As a more specific example, decimator 214 could eliminate the data word corresponding to every other pixel, which would therefore reduce the true data rate by a factor of 2. This is a drastic reduction in data rate, and other reductions might be preferable, as for example elimination of one out of three (3:2) or one out of four (4:3) pixels. Decimators may be implemented as switches which alternately pass and block the pixels applied thereto, or they may include a sample-and-hold function operated at a clock rate lower than the clock rate of the applied signals, or the like. However implemented, decimator 214 when it is in the decimation mode reduces the true data rate being applied over conductor 15 to the noninverting input terminal of subtractor 16.

Since the purpose of the decimating scheme is to reduce the number of difference words applied to buffer 28 by reducing the number of words applied to coder 26, coder 26 must have at least its input clock rate adjusted in response to the selected operating mode of decimator 214, if appropriate. Since the output clocking of coder 26 is asynchronous, this clocking need not be changed in response to the operating mode of the decimator.

Decimator 214 has an effect generally similar to that of a filter. When in a decimation mode, decimator 214 tends to reduce the amount of high frequency data coupled through the system. To the extent that introduction of the decimator does not change the operation or timing of those elements of transmitter 110 which are downstream from the decimator, it also has no effect on receiver 238 other than affecting the high frequency content of the reproduced picture. Since alternate pixels are being deleted in the aforementioned specific example, receiver 238 must accommodate the reduced data rate as by sample-and-holding each pixel for an additional clock period, or by interpolating each missing pixel from its neighbors in an expander. The expander is illustrated as a block 264. There are, however, some problems with the arrangement of FIG. 2.

Some of the problems associated with the arrangement of FIG. 2 are explained with reference to FIG. 3, which is a skeletonized or simplified version of FIG. 2. Elements of FIG. 3 corresponding to those of FIG. 2 are designated by the same reference numerals. Decimator 214 may take any of several forms. Some of the problems are less severe with 2:1 decimation, but as mentioned other decimation ratios may be more advantageous. A simple 2:1 decimator could be implemented by a simple switch, which passes alternate pixels and, for those pixels which are not passed, provides a reference value such as zero on conductor 15'. The first problem which arises when the decimator is switched from a nondecimating mode into the decimating mode is that every other pixel arriving at adder 16 from conductor 15' has zero value, whereas for at least one frame interval following the switchover, each pixel arriving at adder 16 from conductor 25 has a finite value. Consequently, for each correct difference signal generated on conductor 17, at the next clock cycle there follows a difference signal which is the inverse of the corresponding pixel from the previous frame. This inverse pixel occurs because subtractor 16 subtracts the predicted signal (the subtrahend) on conductor 25 (where every pixel has a finite value) from the zero value of the decimated pixel arriving from conductor 15' (the minuend), by inverting the polarity of the predicted signal on conductor 25 and adding it to the zero value on conductor 16, thereby producing a full value (not a difference) corresponding to the magnitude of the pixel of the previous frame, but of opposite polarity. It is clear that these full-value, inverted signals should not be transmitted through channel 30 to receiver 338, because they will result in large codewords, which is contrary to the desired end of reducing the data rate. On the other hand, these full-value, inverted pixels are circulating in predictor loop 20, and if they are somehow prevented from reaching receiver 338, predictor loop 40 will circulate values which do not correspond with those circulating in loop 20. As a result, the reproduced picture will undesirably diverge from the picture being transmitted.

As mentioned above, 2:1 decimation is extreme, and lesser values will generally be desired. Decimators for values other than 2:1 are known in the prior art. Such a decimator (termed a sample rate converter) is described, for example, in U.S. Pat. No. 4,568,965 issued Feb. 4, 1986, in the name of Powers. Such decimators or sample rate converters do not simply delete occasional pixels, but rather produce new sets of pixels with a new clock timing, so that signal is always available on each clock cycle. Thus, rather than calling such a sample rate converter a decimator, it might better be termed a data density "reducer" which reduces the sample density. For simplicity, assume that reducer 214 of FIG. 3 is a 4:3 reducer, which, for each four pixels received over conductor 15, produces on conductor 15' three new pixels, the values of which are related to the values of the four incoming pixels. Therefore, the input section of reducer 214 has a higher data density or data rate than does the output section of the reducer. In this example the data density or data rate at the reducer input is 4/3 higher than at its output. At the moment at which decimator or reducer 214 is switched from a nonreducing to a reducing mode (or from one reducing mode to a further reducing mode), the clocking of the signals arriving at adder 16 from conductors 15' and 25 becomes disparate. That is to say, that predictor loop 20 is clocked at a higher rate than reducer 214, and is producing more samples during each unit time for application over conductor 25 to the inverting input of subtractor 16 than reducer 214 is producing for application to the noninverting input of subtractor 16. More specifically, in the case of 4:3 reduction, each clock cycle of the signal arriving at adder 16 from conductor 15' has a duration of 1 ⅓ times the duration of each clock cycle arriving from conductor 25. It is not clear how this can be handled in subtractor 16. The mathematics of summation would certainly be complex.

FIG. 4 illustrates a possible scheme which might be considered for eliminating the problem of different data densities at subtractor 16 in the arrangement of FIG. 3. The arrangement of FIG. 4 is similar to the arrangement of FIG. 3, and elements of FIG. 4 corresponding to those of FIG. 3 are designated by the same reference numerals. FIG. 4 differs from FIG. 3 in that a second decimator or data density reducer designated 314, and identical to reducer 214, is coupled between the output of predictor and delay circuit 24 and the inverting input of subtractor 16. Reducer 314, being identical to reducer 214, causes the data rate or data density on conductor 25' to equal that on conductor 15', so that subtractor 16 can operate in a simple and straightforward fashion to produce difference signals on conductors 17 and 19 at the lower data density. However, this simply transfers the data density problem to adder 22. This can be readily understood by noting that the error signals applied to adder 22 from conductor 19 are at a relatively lower data density, but the predicted signal produced by predictor and delay circuit 24 and applied by conductor 25 to the other input of adder 22 is at the higher data density. Furthermore, it is not clear what must be done at the receiver to compensate for the effect of reducer 314, taking into account that the predictor loops in the transmitter and receiver must be identical.

FIG. 5 is similar to FIG. 4, but with data density reducer 314 replaced by a reducer 514 connected in a slightly different position, and with a further matching reducer 564 added to receiver 538. Otherwise, FIG. 5 is identical to FIG. 4. Reducer 514 is coupled between the output of predictor and delay circuit 24 and conductor 25, and is placed in operation simultaneously with reducer 214. With the illustrated location of reducer 514, when reducers 214 and 514 are operating in a data or pixel reducing mode, the reduced data density appears on conductor 25, so that subtractor 16 operates with reduced data density at both inputs, and adder 22 likewise operates with equal data densities at both inputs. Similarly, adder 42 of receiver 538 operates with reduced data at both its inputs. However, new problems have arisen. In FIG. 5, one problem is represented by the numerals 3 and 4 associated with the input and output ends of reducer 514 and of predictor and delay circuit 24. The numerals 3 represent the lower clock rate associated with the output signal of reducer 514 and the input signal of predictor and delay circuit 24, while the numerals 4 represent the higher clock rate associated with the output signal from predictor and delay circuit 24 and the input of reducer 514. In some way, predictor and delay circuit 24 must accept three data samples per unit time, and produce or output four data samples in that unit time. This is not a simple matter, especially when considering that more than one mode of operation is required. The first mode of operation corresponds to the mode when no data reduction is necessary, and a second mode is the reducing mode. Furthermore, it may be desirable to have further values of data reduction other than 4:3, as for example 8:7, and there must therefore be provision for many operating modes. The same problem also arises at the receiver. Remember that receiver prediction loop 40 must be identical to transmitter prediction loop 20. Since loop 20 includes a reducer 514 connected to the output terminal of predictor and delay circuit 24, loop 40 also includes a reducer illustrated as 564 connected to the output of prediction and delay circuit 44. Some way must also be found to cope with the fact that before decimation begins, predictor and delay circuit 24 of transmitter 510 contains a full frame of full density data, but during reduced data operation it contains less information; it would appear that to prevent artifacts, an entire frame of stored data must be reduced instantly at the moment of switchover. Correspondingly, when switching out of the data reduction mode, the data then stored in predictor and delay circuit 24 must instantaneously be augmented. This problem also occurs at the receiver, in that at the moment of changing modes, the data stored in predictor and delay circuit 44 must be instantaneously increased or decreased.

U.S. Pat. No. 4,488,175 issued Dec. 11, 1984, to Netravali describes a predictive coding communication system in which a 2:1 decimator (213) follows the predictive loop in the transmitter and acts on the difference signal flowing to the coder. In this arrangement, the difference signal produced at the output of the subtracting circuit (207) in the transmitter has full data density at all times. However, the corresponding predictor in the receiver receives as an input signal difference signals having 2:1 density reduction. Thus, the predictor loops in the transmitter and the receiver are fundamentally different. In order to cause the predictor loop in Netravali's transmitter to produce substantially correct predicted signals (signals corresponding to those produced by the receiver), the path to the input to the predictor and delay circuit of the transmitter (201) from the transmitter adder (209) includes a switched circuit (including elements 210, 211, 212 and 250) which produces samples which during alternate clock cycles are simply the output pixel of the adder, and which during the next clock cycle are the average of two adjacent pixels. The Netravali arrangement has no data density problems associated with the predictor loop, because its reducer or decimator is coupled between the predictor loop and the coder. The Netravali system has the problem of lack of identity of the transmitter and receiver prediction loops, and does not seem to be amenable to data reductions other than 2:1, because simple dropping of pixels, other than in a 2:1 pattern, produces an undesirable pattern in the reproduced picture.

SUMMARY OF THE INVENTION

A method and apparatus for differential pulse code modulation of frame sequential signals includes a subtractor for subtracting delayed predicted signals from the frame-sequential signals to produce difference signals, and a decimator for controllably decimating the frame-sequential signals, which causes a data density difference at the subtractor. A further decimator controllably decimates the delayed predicted signals to eliminate a data density difference at the subtractor. An adder adds together the decimated delayed predicted signals and the difference signals to produce current predicted signals, which results in a data density difference between the current and delayed predicted signals. An interpolator interpolates the current predicted signals to produce interpolated current predicted signals, the data density of which is equal to that of the delayed predicted signals. A predictor operates on the interpolated current predicted signals by at least delaying them to produce the delayed predicted signals.

DETAILED DESCRIPTION OF THE INVENTION

Figure 1:
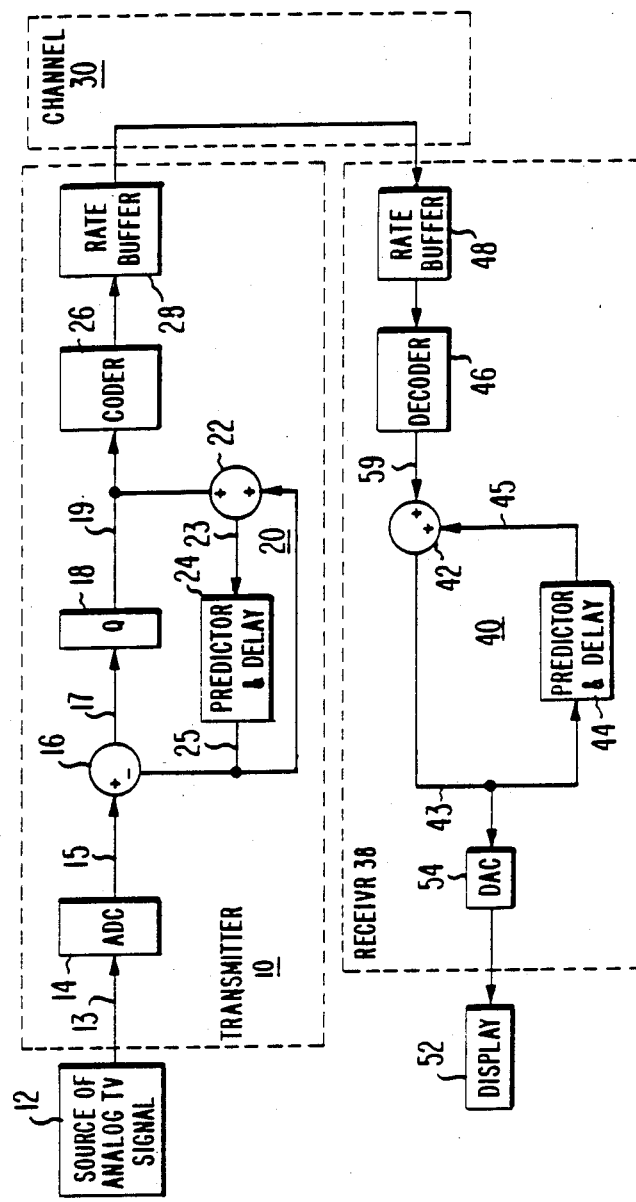
FIG. 1 is a block diagram of a data communication system using the prior art predictive coding system.
Figure 2:
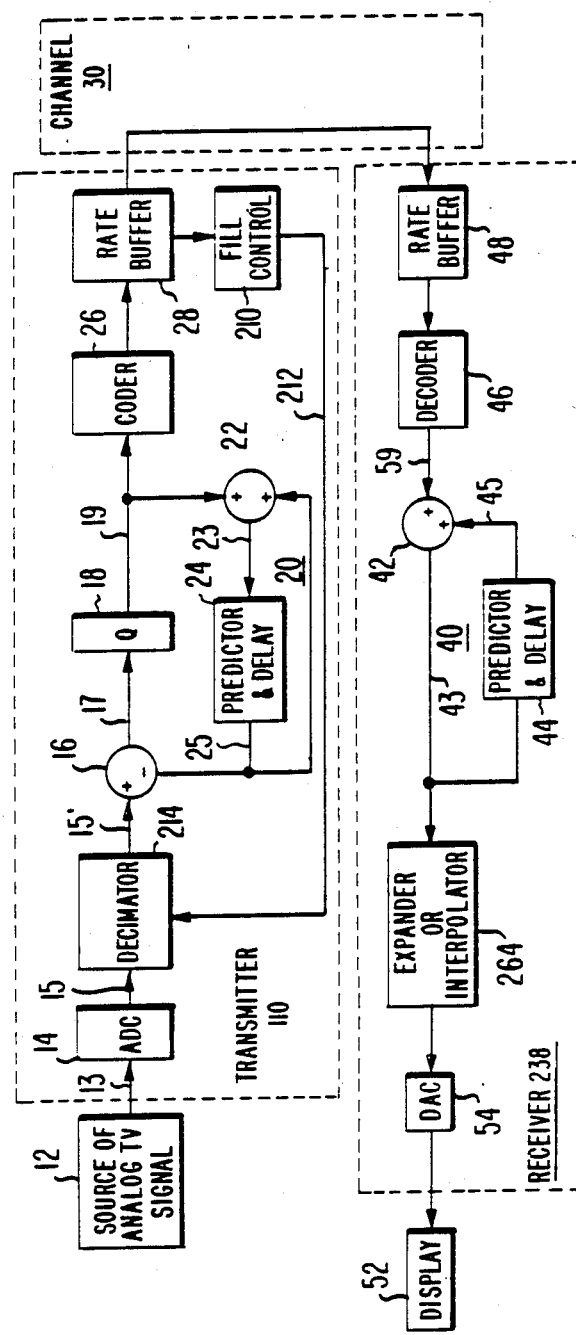
FIG. 2 is a block diagram of a communication system similar to that of FIG. 1, further including a decimator arranged to decimate the applied television signals, and also including a fill control circuit for controlling the decimator in response to the occupancy or degree of lading of the rate buffer.
Figure 3:
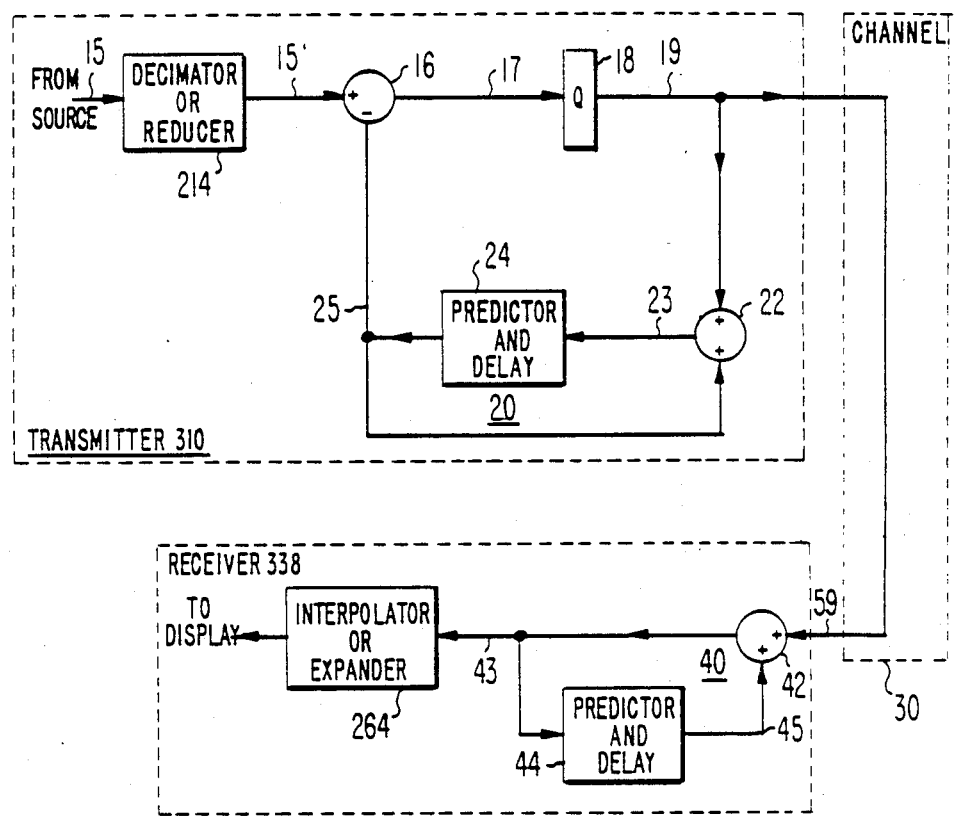
FIG. 3 is a simplified block diagram of the arrangement of FIG. 2.
Figure 4:
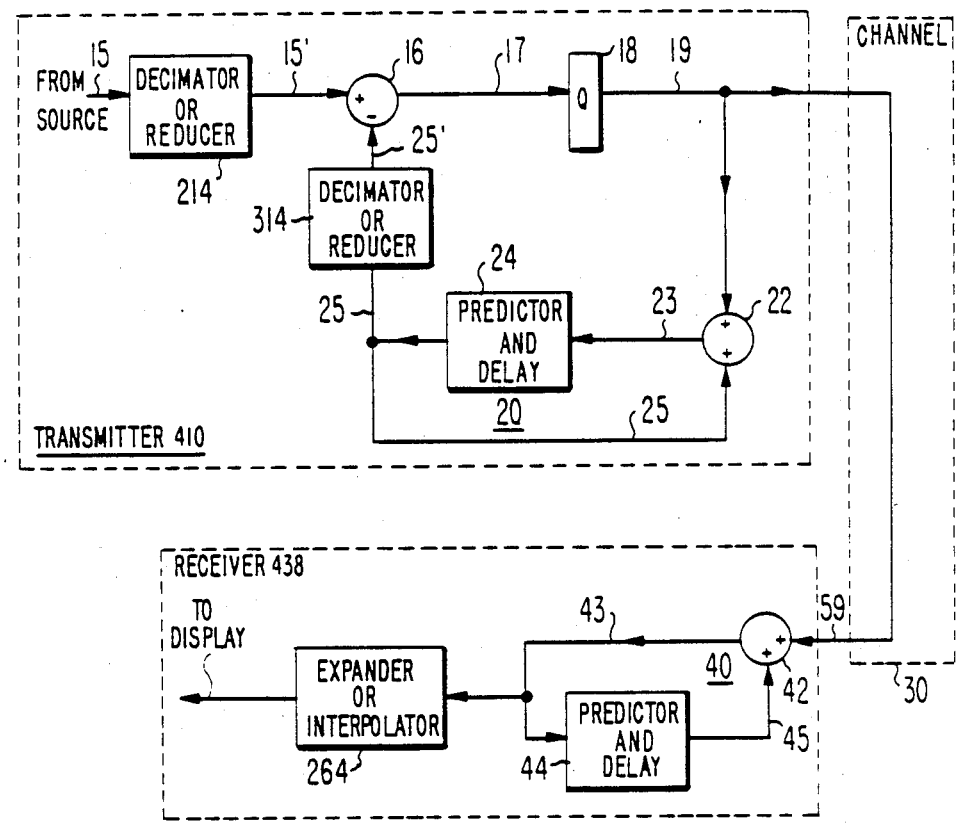
FIGS. 4 and 5 are diagrams similar to FIG. 3, further including a second decimator or reducer, for aiding in understanding certain problems associated with data rate reductions.
Figure 5:
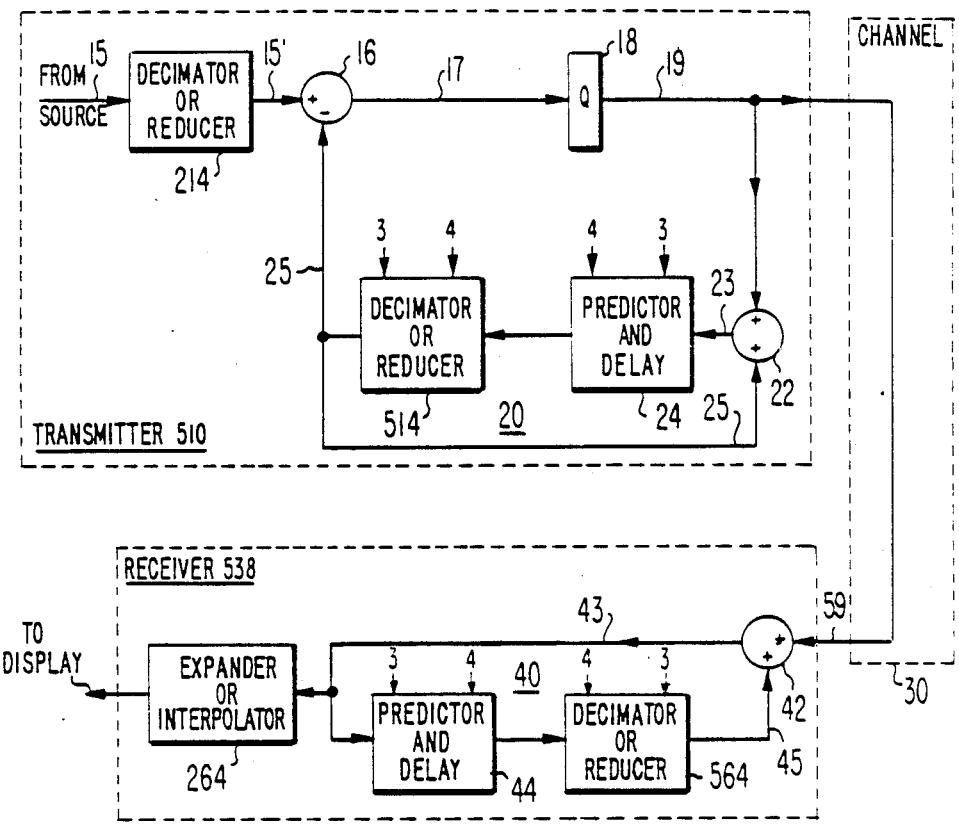
Figure 6:
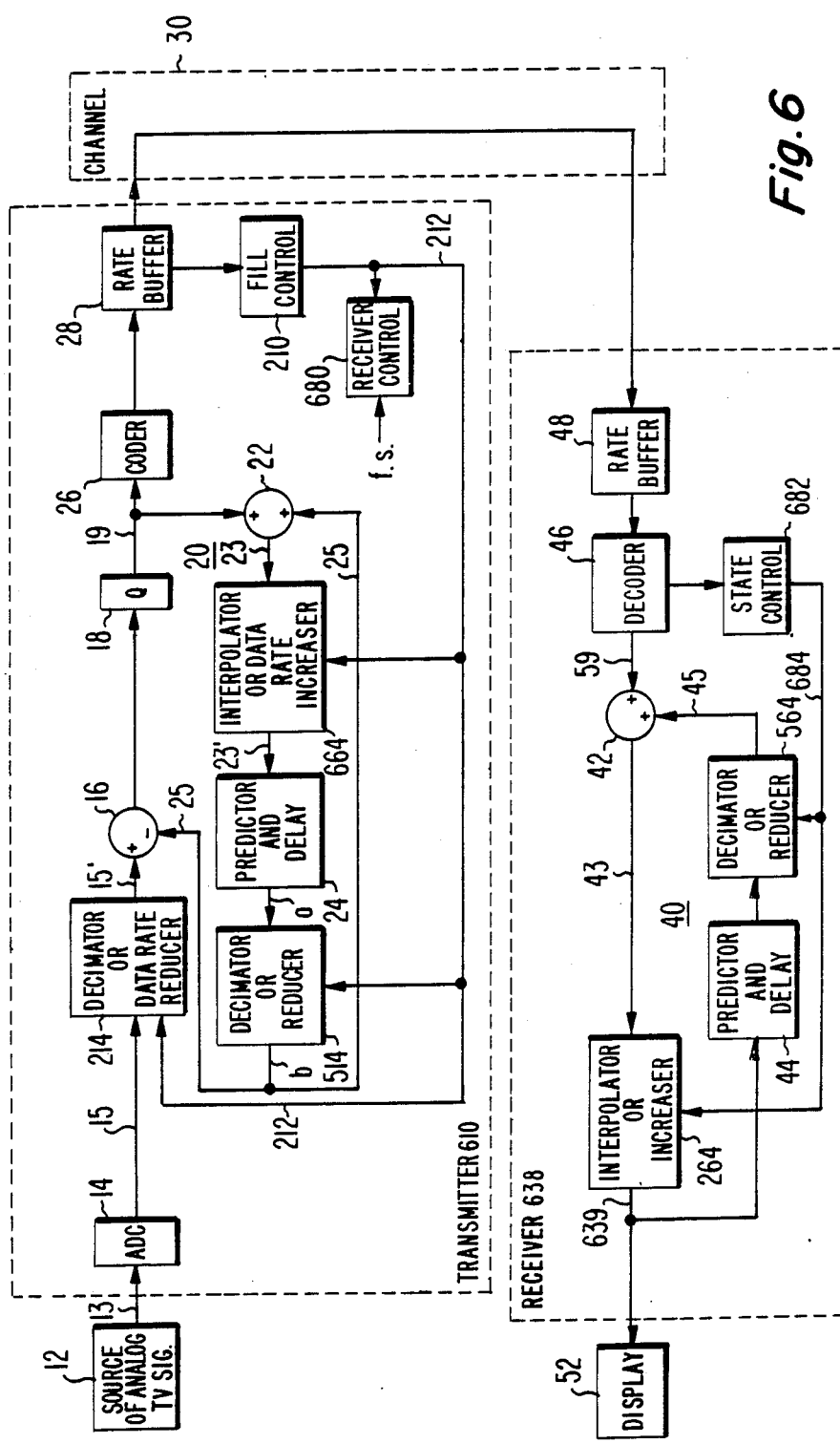
FIG. 6 is a simplified block diagram of a predictive communication system according to an embodiment of the invention.

FIG. 6 is a simplified block diagram of a predictive coding system according to an embodiment of the invention. FIG. 6 is generally similar to FIGS. 1 and 5, and elements of FIG. 6 corresponding to those of FIGS. 1 and 5 are designated by the same reference numerals. The arrangement of FIG. 6 by comparison with FIG. 5 further includes an interpolator, data rate increaser or data density increaser 664 connected by conductors 23 and 23' between the output of adder 22 and the input of predictor and delay circuit 24 in transmitter 610. Interpolator or data density increaser 664 is coupled to conductor 212 for receiving fill control signal from fill control circuit 210 for being energized simultaneously with decimators 214 and 514. Interpolator 664 produces two nonzero pixels for each pixel having nonzero value applied thereto during those times when decimators 214 and 514 reduce the data rate by 2:1. In the simple case of 2:1 data reduction by decimators 214 and 514, interpolator 664 might pass the undecimated difference pixels, and interpolate between the undecimated difference pixels to produce average or interpolated pixels therebetween, thereby generating an intermixture of alternating unaffected and interpolated pixels for application from adder 22 to predictor and delay circuit 24. Such a simple interpolator including elements 210, 211, 212 and 250 is shown in FIG. 2 of the aforementioned Netravali patent. Alternatively, interpolator 664 might produce four pixels for every three pixels applied thereto when decimator or data rate reducers 214 and 514 reduce the number of pixels by the factor of 4:3. Such interpolators or increasers are known in the art. An arrangement similar to the aforementioned Powers arrangements acts as an interpolator when converting from a smaller sample rate to a higher sample rate. Thus, transmitter 610 of FIG. 6 receives full density data on conductor 15 for application to decimator 214, which decimates or reduces the data rate of the input signal currently applied over conductor 15' to the noninverting input of subtractor 16. Subtractor 16 takes the difference between the decimated input signal and the decimated delayed predicted signal on conductor 25 to produce difference signals at the lower or decimated data rate for application through coarse quantizer 18 to conductor 19. The difference or error signal produced on conductor 19 is applied by way of coder 26, rate buffer 28 and channel 30 to receiver 638. The difference signals on conductor 19 are also applied to adder 22 to be added to the decimated delayed predicted signals on conductor 25 to produce current predicted signals on conductor 23 at the lower data rate of the decimated signals. The current predicted signals on conductor 23 are interpolated or have their data density increased in interpolator 664 to produce current predicted signals at a higher data rate on conductor 23'. Predictor and delay circuit 24 receives the restored density or higher density signals from conductor 23 and delays them, by a pixel interval, line interval or frame interval as required by the type of prediction desired, to produce delayed predicted signals at the higher data rate on a conductor designated a, for application to decimator or data rate reducer 514, which decimates the signals by the same amount as decimator 214 to produce the decimated delayed predicted signal on conductor 25. Predictor and delay circuit 24 always operates with the same data rate at its input and output terminals, because the interpolation by interpolator 664 is exactly the inverse of the decimation performed by decimator 514. Also, the data rate at which predictor and delay circuit 24 operates is equal to the data rate of the current input signals applied from conductor 15 to decimator 214, because the decimations performed by decimators 214 and 514 are identical.

Receiver 638 of FIG. 6 receives reduced density error signals from channel 30. In order to regenerate the signals in receiver 638 in exactly the fashion in which predicted signals are generated in transmitter 610, the already existing elements are not changed from what they were in FIG. 5, but their connections are rearranged. The difference signals received by adder 42 from channel 30, rate buffer 48 and decoder 46 are at the lower or decimated data rate, and therefore the current predicted signals produced on conductor 43 are at the lower data rate. Interpolator or data density increaser 264 has an interpolation characteristic identical to that of interpolator 664 of transmitter 610 (and the inverse of decimator 214), and therefore interpolator 264 produces on conductor 639 current predicted signals which are at the higher data rate corresponding to the data rate of the signals originally applied from source 12 to transmitter 610. The signals on conductor 639 are applied to display 52, and are also applied to predictor and delay circuit 44. Predictor and delay circuit 44 delays the higher data rate current predicted signal on conductor 639 by the same amount as the delay provided by predictor and delay circuit 24 of transmitter 610 (and may also perform any other processing, such as averaging of adjacent pixels), and produces delayed predicted signals at the higher data rate for application to decimator or data rate reducer 564. Decimator 564 has a decimation characteristic which is identical to that of decimator or data reducers 214 and 514, and exactly the inverse of the interpolation characteristic of interpolator 264, and therefore decimator 564 produces on conductor 45 delayed predicted signals at the lower data rate, corresponding to the data rate of difference signals applied to adder 42 over conductor 59. Adder 42 receives the lower rate signals at both inputs as required for proper operation.

Not discussed so far is the fact that interpolator 264, and decimator 564 of receiver 638 must be switched into operation concurrently with the switching of decimators 214 and 514 and interpolator 664, of transmitter 610 (i.e. at the time at which the decimated frame is issued by decoder 46). In order to reduce the overhead required to be transmitted over data channel 30 for control at receiver 638 of the state of interpolator 264 and decimator 564, the control signal which commands the switching is transmitted a maximum of once each frame interval, depending upon the state of the fill control signal on conductor 212. This control function is performed in transmitter 610 of the arrangement of FIG. 6 by a receiver control circuit illustrated as a block 680, which responds to the fill control signal and to other signals such as frame synchronizing (fs) signals to produce command words which are coupled by paths (not illustrated) to coder 26 where they are coded, and from which they pass through rate buffer 28 and channel 30 to receiver 638. At receiver 638, a state control circuit illustrated as a block 682 receives the command word or words from decoder 46 and produces a control signal on a conductor 684 for control of interpolator 264 and decimator 564. Such control functions are well within the skill of the art, and further discussion is deemed to be unnecessary.

Figure 7:
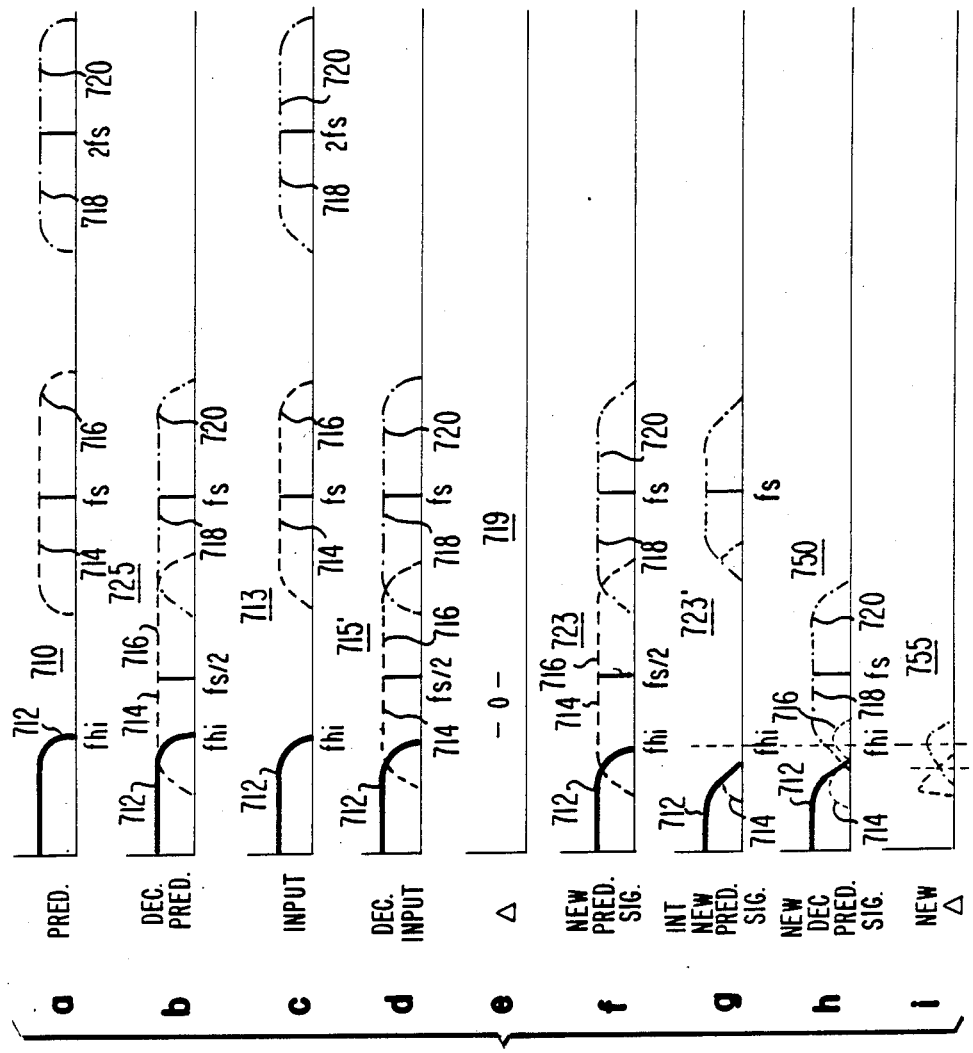
FIGS. 7a–7i, referred to jointly as FIG. 7, are amplitude-frequency spectra representing signals occurring during operation in the arrangement of FIG. 6.

FIG. 7 illustrates signal spectra at various locations in the arrangement of FIG. 6. A still or practically still picture is assumed for purpose of explanation. Also, the effects of quantizer 18 are ignored in FIG. 7. After the arrangement of FIG. 6 has been operating in a non-decimating mode for a long period of time with a still picture, predictor and delay circuit 24 will contain a replica of the image in the form of signal. The spectrum of the predicted signal produced by predictor and delay circuit 24 on the conductor designated a is illustrated as 710 of FIG. 7a. Signal spectrum 710 includes a baseband portion 712 extending from zero frequency to a frequency $f_{hi}$, and images (sidebands) of baseband portion 712 located about the sampling frequency (fs), twice the sampling frequency (2fs) and other harmonics of the sampling frequency. Harmonics of fs higher than 2fs are ignored, for simplicity. In FIG. 7a, the lower and upper sidebands about frequency fs are illustrated in dashed lines and designated 714 and 716 respectively, and the lower and upper sidebands located about frequency 2fs are illustrated by dotted lines and are designated at 718 and 720, respectively. FIG. 7b illustrates as a spectrum designated generally as 725 the decimated predicted signals on output conductor b of decimator or reducer 514, a moment after transmitter 610 has been switched into a decimating mode by causing decimators 214 and 514, to decimate by a factor of 2:1 and interpolator 664 to correspondingly increase the data density. Baseband portion 712 of frequency spectrum 725 is identical to that of FIG. 7a, but frequency sidebands fs and 2fs have been converted to fs/2 and fs, respectively. This causes lower sideband 714 of sampling frequency fs/2 to substantially overlap with baseband signal 712, creating an alias region below frequency $f_{hi}$. The input signal applied to decimator 214 over conductor 15 in transmitter 610 (FIG. 6) is illustrated by signal spectrum or waveform 713 of FIG. 7c. Signal spectrum 713 includes baseband portion 712 and sideband pairs 714, 716; 718, 720 located about frequencies fs and 2fs, respectively. Spectrum 713 does not change from one decimating mode to another. FIG. 7d illustrates as a spectral distribution 715' the decimated input signals on conductor 15' from the output of decimator 214 of FIG. 6. Spectral distribution 715' is identical to spectral distribution 725, since the decimation performed by decimator 214 is identical to that performed by decimator 514. FIG. 7e illustrates the difference signal (Δ) resulting from subtracting the decimated predicted signal represented by spectral distribution 725 (FIG. 7b) from the decimated input signal represented by spectral distribution 715' (FIG. 7d) in subtractor 16 of FIG. 6. As illustrated, the difference signal is zero. This means the transmitter is operating correctly, but further analysis shows that a minor problem remains in this arrangement.

FIG. 7f illustrates as a spectral distribution 723 the new predicted signals produced on conductor 23 of FIG. 6 by adder 22. Adder 22 receives zero difference signal (FIG. 7e) from conductor 19, so the new predicted signal on conductor 23 is merely the decimated predicted signal illustrated by the distribution 725 of FIG. 7b. Thus, spectral distribution 723 of FIG. 7f, representing the new predicted signal, is identical to spectral distribution 725 of FIG. 7d. Interpolator or data rate increaser 664 of FIG. 6 interpolates the signal represented by spectral distribution 723 (by a factor of 2:1 in the example). Interpolators have inherent low pass characteristics, but with poor skirt selectivity. Interpolator 664 in effect low pass filters the baseband signal and bandpass filters some of the image signals as an adjunct to the interpolation process, thereby reducing the amplitude of the components near frequency fs/2. The resulting interpolated new predicted signal has a spectral distribution illustrated as 723' of FIG. 7g. The interpolation removes the principal portions of sidebands 714 and 716 centered at frequency fs/2, but due to the finite and shallow attenuating capabilities of practical interpolators, does not fully attenuate the high-frequency portion of baseband spectrum 712 (those portions near $f_{hi}$), and does not substantially affect those portions of sideband 714 falling below frequency $f_{hi}$. Thus, the interpolated signal produced by interpolator 664 on conductor 23' of FIG. 6 includes an aliasing component illustrated by the overlap of spectral portions 712 and 714 in FIG. 7g, and has a high frequency attenuation of baseband signal portion 712. When the interpolated new predicted signal represented by spectral distribution 723' of FIG. 7g is decimated by decimator 514 (FIG. 6), a new decimated predicted signal is produced on conductor b which is illustrated by distribution 750 of FIG. 7h. As can be seen in FIG. 7h, the region below frequency $f_{hi}$ includes baseband portion 712 as modified by the effect of interpolator 664, alias component 714 attributable to the original decimated predicted signal, and further aliasing components from original sidebands 714 and 718. When the new decimated predicted signal illustrated by spectral distribution 750 is applied to subtractor 716, high frequency new difference signals are generated which are unrelated to the original signal content, but which arise due to the effects of decimation and interpolation. It will be recognized that these high frequency signals circulate through the system, perturbing the image represented thereby.

Figure 8:
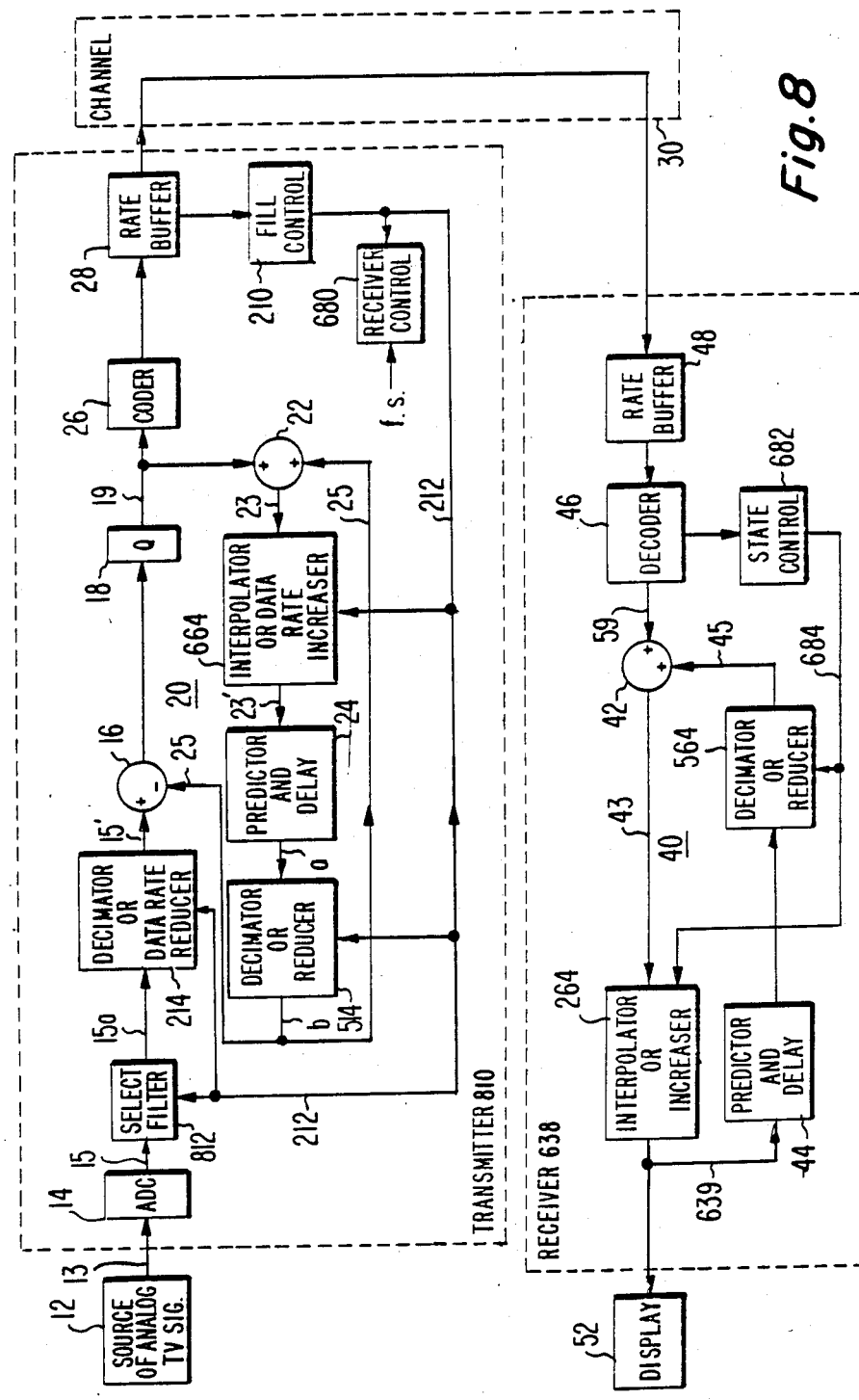
FIG. 8 is a block diagram similar to FIG. 6, further including a filter according to another embodiment of the invention, for solving a problem identified in conjunction with FIG. 7.

FIG. 8 is a block diagram of another embodiment of the invention. Those elements of FIG. 8 corresponding to elements of FIGS. 1 through 6 are designated by the same reference numerals The arrangement of FIG. 8 is similar to that of FIG. 6, but differs in that a selectable low pass filter 812 has been connected by conductors 15 and 15a between ADC 14 and decimator 214 of transmitter 810. Filter 812 is connected to conductor 212 for being controlled simultaneously with decimators 214 and 514, and with interpolator 664. In operation in a nondecimating mode, decimators or reducers 214 and 514 do not decimate, interpolator or data rate increaser 664 does not increase the data rate or date density, and selectable filter 812 has maximum bandpass in order to provide the highest resolution picture. When fill control circuit 210 produces a fill control signal on conductor 212 indicating that some decimation is required, decimators 214 and 514 are set to the same, predetermined amount of data reduction (2:1 in the example). Interpolator or data rate increaser 664 is correspondingly set to an exactly inverse data density increase, as mentioned. The decimation or density reduction of the signals reduces the effective data density or data rate of the signals. This results in an effective reduction in the rate at which the incoming pixels are sampled, which may result in aliasing if the information rate is too high, as known from the Nyquist criteria. In order to reduce aliasing, selectable filter 812 is also switched into a band limiting or low-pass mode simultaneously with the switching into a decimating mode to reduce the effective resolution of the image which is represented by the signal applied to decimator 214. No filter corresponding to filter 812 is necessary in receiver 638.

Figure 9:
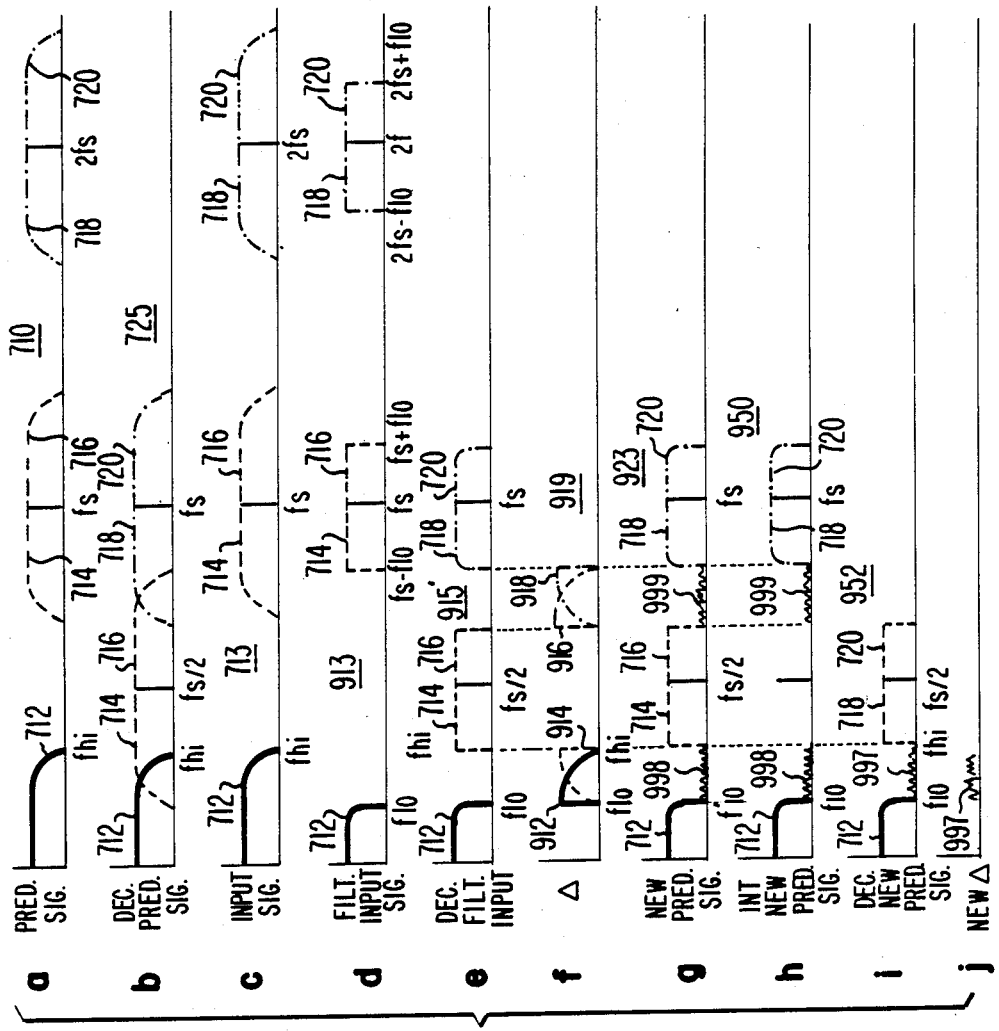
FIGS. 9a–9i, referred to jointly as FIG. 9, are amplitude-frequency spectra representing signals occurring during operation of the arrangement of FIG. 8.

FIG. 9 illustrates spectra of signals occurring in the arrangement of FIG. 8 during operation. In FIG. 9, spectra 710 of FIG. 9a, 725 of FIG. 9b, and 713 of FIG. 9c are identical to those of FIG. 7. Spectrum 710 of FIG. 9a represents the predicted signal produced on the conductor designated a by predictor and delay circuit 24 after a long period of operation in a nondecimating mode. Spectrum 725 of FIG. 9b represents the output of decimator or reducer 514 on conductor b a moment after being switched into a decimating mode. Spectrum 713 of FIG. 9c represents the input signal applied to filter 812 over conductor 15, regardless of the mode of operation. Spectral distribution 913 of FIG. 9d represents the signal occurring on conductor 15a of the arrangement of FIG. 8 a moment after filter 812 is switched into a reduced bandwidth mode concurrently with the beginning of decimation. As illustrated in FIG. 9d, the baseband portion (712) of the input signal is cut off near a frequency $f_{lo}$, lower than $f_{hi}$, and the sidebands 714, 716; 718, 720 centered about frequencies fs, 2fs, respectively, are also of reduced bandwidth. Spectral distribution 915' of FIG. 9e illustrates the filtered, decimated input signal on conductor 15' of FIG. 8 as a result of decimation by decimator 214 of filtered input signal having spectral distribution 913. In contrast to the situation which occurred as described in the arrangement of FIG. 7, the decimation of the input signals does not result in aliasing. Spectral distribution 919 of FIG. 9f illustrates the difference signal (Δ) appearing on conductor 19 (FIG. 8) resulting from subtracting decimated predicted signals illustrated by distribution 725 of FIG. 9b from decimated filtered input signals illustrated by spectral distribution 915' of FIG. 9e. As illustrated in FIG. 9f, the difference signal includes baseband portion 912 extending from frequency $f_{lo}$ to $f_{hi}$ superimposed upon a portion of sideband 914, and the difference signal further includes sideband portions 916 and 918 at frequencies between fs/2 and fs. Since the difference signals do not take on zero magnitude immediately upon switching into a decimating mode, the desired effect of reducing the loading of the rate is not achieved. Also, these difference signals are coded and transmitted to receiver 638, where they result in a trailing, decaying ghost following moving edges in the displayed image. These difference signals are "inverted" in polarity, since they represent the subtrahend in the subtraction process. The difference signal represented by spectral distribution 919 is also coarsely quantized, which has an effect described below. The difference signal represented by spectral distribution 919 (FIG. 9f) is added (with due attention to polarity) to the decimated predicted signal (725 of FIG. 9b) in adder 22 of FIG. 8, producing on conductor 23 the new predicted signal illustrated by spectral distribution 923 of FIG. 9g. As illustrated in FIG. 9g, the new predicted signal includes baseband portion 712 extending from zero frequency to frequency $f_{lo}$, a portion of "hash" 998 (in the frequency range between $f_{lo}$ to $f_{hi}$), resulting from the effect of quantizer 18 on the cancellation of the high frequency portions of the baseband signal, and sidebands about frequencies of fs/2 and fs. The sidebands about fs/2 and its harmonics include further "hash" illustrated as 999. The new predicted signal produced on conductor 23, and having the spectral distribution illustrated by 923 of FIG. 9g, is interpolated by interpolator 664 (FIG. 8). The interpolation produces on conductor 23' an interpolated new predicted signal having a spectral distribution illustrated by 950 of FIG. 9h, in which the region around frequency fs/2 is substantially attenuated. The interpolated new predicted signal on conductor 23' as represented by spectral distribution 950 includes baseband portion 712 extending to frequency $f_{lo}$, and a high frequency region including quantizing hash 998 because the interpolator has poor filter characteristics. The sideband portions extending about sampling frequency fs remains substantially unchanged. The interpolated new predicted signal on conductor 23' as illustrated by spectral distribution 950 is delayed in predictor and delay circuit 24, and applied over the conductor designated a to decimator 514, which decimates the interpolated new predicted signal (950 of FIG. 9h), and produces a decimated new predicted signal, having the spectral distribution illustrated as 952 of FIG. 9i. Distribution 952 also includes downconverted sidebands 718 and 720 located about frequency fs/2. Furthermore, the region between frequency $f_{lo}$ and $f_{hi}$ includes hash portion 998 and superposed hash portion 999, designated together as 997. The new difference signal generated at the output of subtractor 16 by subtracting the decimated new predicted signal (952 of FIG. 9i) from the decimated filtered input signal (915 of FIG. 9e) results in approximately zero difference signal, as illustrated by distribution 955 of FIG. 9j. The only difference between the new difference signal of distribution 955 and a true zero is the hash portion attributable to quantization, illustrated by region 997 of distribution 955. Thus, the arrangement of FIG. 8 including selectable filter 812 when switched in conjunction with a change of modes produces an essentially zero difference signal (FIG. 9j) as required. However, as mentioned in conjunction with FIG. 9f, one result of the arrangement of FIG. 8f is a trailing and decaying ghost following moving edges near the time of transition between modes.

Figure 10:
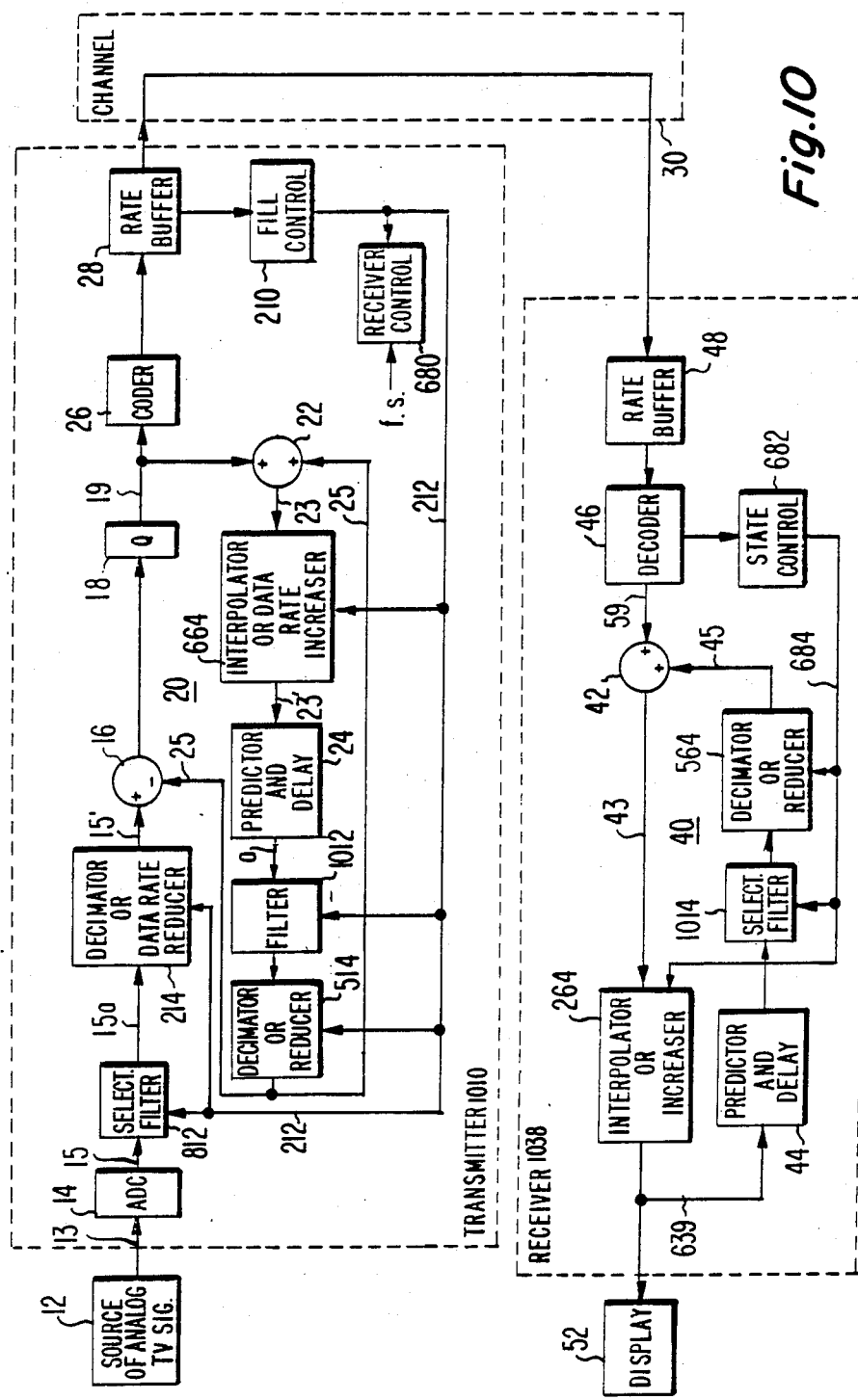
FIG. 10 is a block diagram similar to FIG. 8, including further filtration for solving a problem identified in conjunction with FIG. 9.

FIG. 10 illustrates another embodiment of the invention further including filters for correcting the problem of moving decaying ghosts identified in conjunction with FIG. 9. FIG. 10 is similar to FIG. 9, but includes in transmitter 1010 a further filter 1012 connected between predictor and delay circuit 24 and decimator 514. Filter 1012 is connected to conductor 212 for receiving fill control signals for being switched at the same time as filter 812. Also, the embodiment of FIG. 10 includes a further filter 1014 in receiver 1038, which is connected between predictor and delay circuit 44 and decimator 564 in a position corresponding to that of filter 1012. Filter 1014 is connected to conductor 684 for being controlled in conjunction with interpolator 264 and decimator 564. Filters 1012 and 1014 are identical, and are switched at corresponding times.

Figure 11:
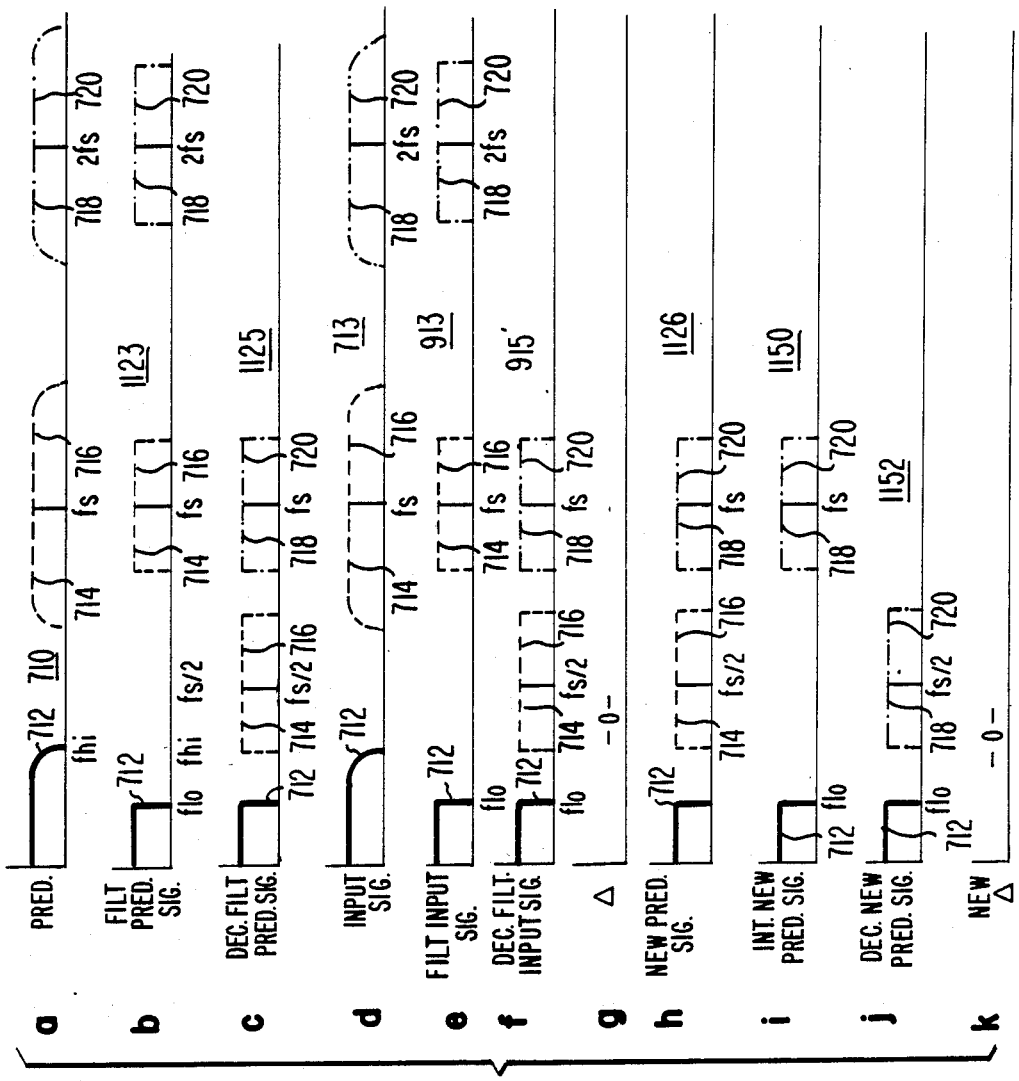
FIGS. 11a–11i, referred to jointly as FIG. 11, are amplitude-frequency spectra representing signals occurring in the arrangement of FIG. 10 during operation.

FIG. 11 illustrates the spectral distributions of various signals occurring in the arrangement of FIG. 10 during operation. FIG. 11a is identical to FIG. 9a, and represents the spectrum of the predicted signal produced on the conductor designated "a" immediately after a change from a nondecimating mode to a decimating mode. FIG. 11b illustrates as a spectral distribution 1123 the result of filtering spectral distribution 710 of FIG. 11a filter 1012 of FIG. 10. As illustrated in FIG. 11b, baseband portion 712 is limited to an upper frequency $f_{lo}$, and the sidebands formed about frequencies fs, 2fs . . . are similarly limited. FIG. 11c illustrates as a spectral distribution 1125 the result of decimating the signal represented by spectral distribution 1123 in decimator 514 of transmitter 1010. Spectral distribution 1125 has a baseband portion 712 unchanged from that of FIG. 11b, but the sampling frequency and harmonics of the sampling frequency together with their sidebands, are translated to lower frequencies. Because of the effect of filter 1012 (FIG. 10), the decimated predicted signal produced on conductor b by decimator 514 does not contain alias components. FIG. 11d is identical to FIG. 9c, and represents the unfiltered input signal applied to filter 812. FIG. 11e is identical to FIG. 9d, and represents as a spectrum 913 the filtered input signal appearing on conductor 15a of transmitter 1010 of FIG. 10. FIG. 11f is identical to FIG. 9e, and represents as a spectrum 915' the decimated signal applied over conductor 15' to the noninverting input terminal of subtractor 16 of FIG. 10. FIG. 11g illustrates the difference signal produced at the output of subtractor 16 as a result of subtracting the signal represented by spectral distribution 1125 of FIG. 11c from the signal represented by spectral distribution 915' of FIG. 11f. As illustrated in FIG. 11g, the difference signal is zero.

FIG. 11h illustrates as a spectral distribution 1126 the new predicted signal produced on conductor 23 by adder 22 of the FIG. 10, as a result of the addition of the zero difference signal of FIG. 11g to the decimated filtered predicted signal represented by spectral distribution 1125 of FIG. 11c. As illustrated, spectral distribution 1126 of FIG. 11h is identical to spectral distribution 1125 of FIG. 11c. FIG. 11i illustrates as a spectral distribution 1150 the interpolated new predicted signal produced by interpolator 664 on conductor 23' (FIG. 10) as a result of interpolating the signal represented by spectral distribution 1126 of FIG. 11h. The poor attenuation characteristics of the interpolator has no adverse effects in the frequency regions between baseband portion 712 and sideband 714 because these regions are already devoid of spectra due to the action of filters 812 and 1012. Predictor and delay circuit 24 does not affect the shape of distribution 1150. FIG. 11j illustrates as a spectral distribution 1152 the decimated new predicted signal produced by decimating the new predicted signal of FIG. 11i in decimator 514 (FIG. 10). FIG. 11k illustrates the new difference signal produced by subtracting the decimated new predicted signal having distribution 1152 of FIG. 11j from the decimated filtered input signal of FIG. 11c. As illustrated, the new difference signal is zero. Thus, the arrangement of FIG. 10 is self-consistant, and does not produce either fixed or trailing ghosts.

Figure 12A:
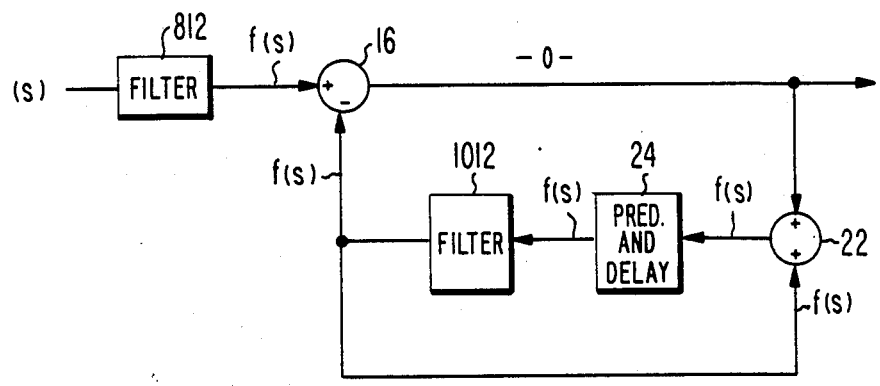
FIGS. 12a and 12b, referred to jointly as FIG. 12, are more simplified block diagrams of the arrangement of FIG. 10, bearing designations aiding in understanding a further problem.

FIG. 12a is a simplified block diagram of the arrangement of FIG. 10. In FIG. 12a, elements corresponding to those of FIG. 10 are designated by the same reference numeral. FIG. 12 is intended to aid in understanding a minor problem associated with the arrangement of FIG. 10. In FIG. 12a, an unfiltered signal represented by (s) is applied to filter 812 and is filtered a first time, as represented by the notation f(s), and is applied to the noninverting input terminal of subtractor 16. If the signal applied to the inverting input terminal of subtractor 16 is also f(s), the difference signal produced at the output of subtractor 16 is zero. At adder 22, once-filtered signal f(s) is applied to a first input, and the difference signal having zero amplitude is applied to the second input, with the result that the new predicted signal at the output of adder 22 is f(s). Signal f(s) is delayed in predictor and delay circuit 24, and is applied to filter 1012. Filter 1012 is identical to the filter 812, and further filters signal f(s) to produce a doubly filtered signal designated ff(s). (Not illustrated in FIG. 12a).

Figure 12B:
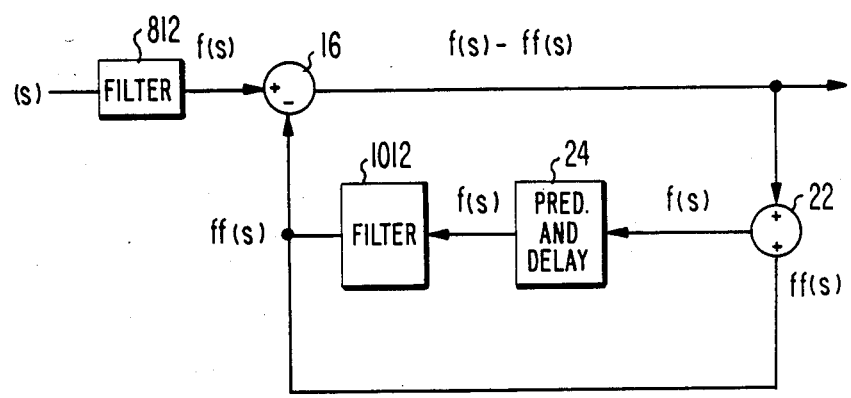
Figure 13:
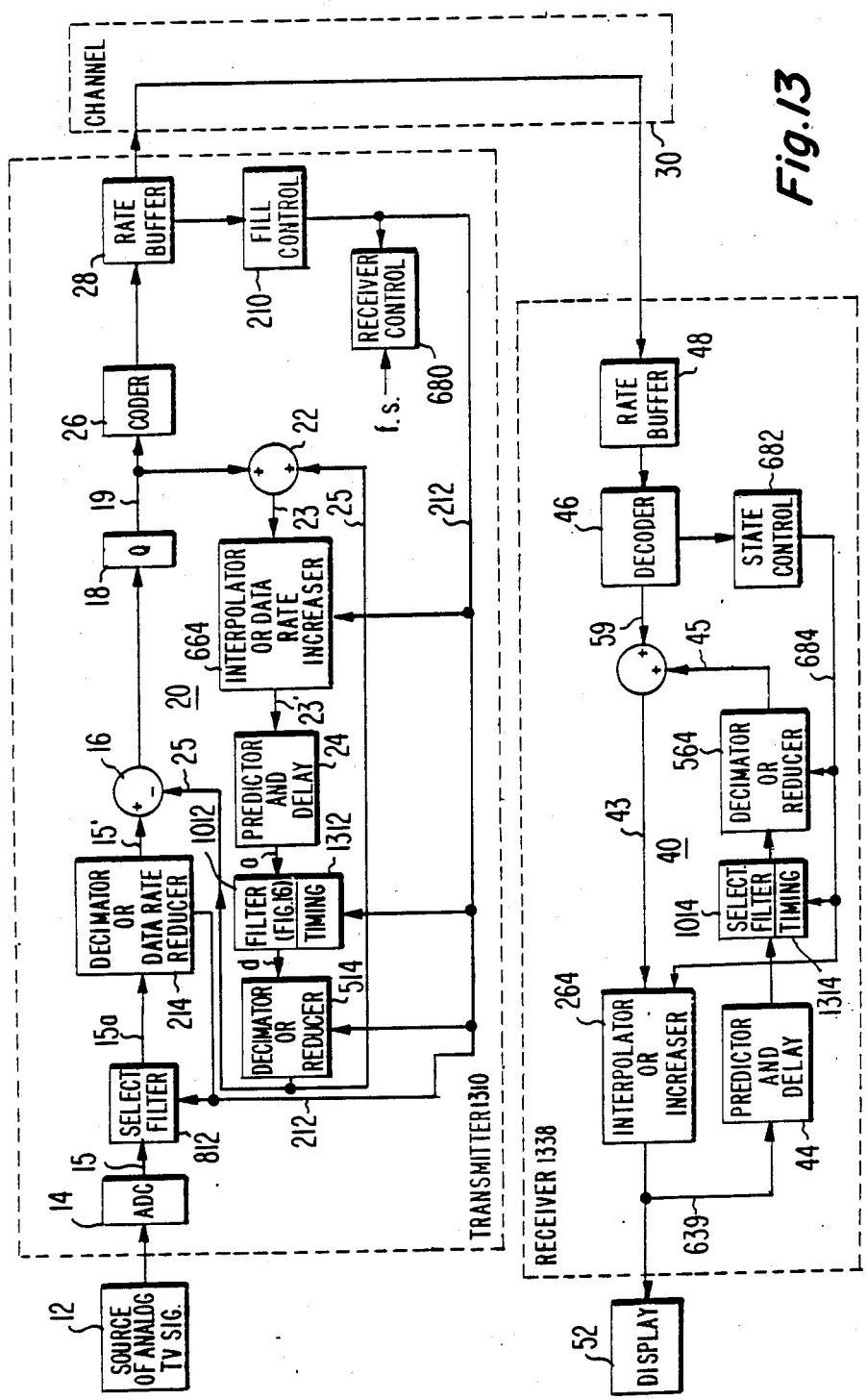
FIG. 13 is a block diagram similar to FIG. 10, further including a timing control for solving the problem identified in conjunction with FIG. 12.

Referring now to FIG. 12b, and knowing that the signal which is applied to the inverting input terminal of subtractor 16 is actually twice-filtered signal ff(s), the output difference signal of subtractor 16 is f(s)-ff(s). This difference signal is applied to one input terminal of adder 16, together with twice filtered signal ff(s) from the output of filter 1012. The difference between the two is once-filtered signal f(s), which passes through predictor and delay circuit 24 to be applied to filter 1012, which then produces twice filtered signal ff(s). Thus, it can be seen that the difference signal which is made available at transmitter 1010 for application to the coder and through the channel receiver is signal f(s)−ff(s), which includes a twice-filtered component. This twice-filtered component reduces the effective resolution of an image as sent to the receiver, and degrades the reproduction thereof FIG. 13 is a block diagram of another embodiment of the invention further including timing control for controlling the operation of filters 1012 at the transmitter and 1014 at the receiver. The timing control is illustrated by a timing control portion 1312 of filter block 1012 of transmitter 1310, and by a timing control portion 1314 of the block including filter 1014 of receiver 1338. In operation, timing control 1312 switches filter 1012 into the appropriate filtering mode concurrently with the switching of filter 812 and the various decimators and interpolators. However, rather than remaining in the filtering mode indefinitely, or until the mode is changed by the fill control signal, timing control 1312 causes filter 1012 to revert to a nonfiltering mode after a predetermined time. It has been found that a suitable predetermined time for a practical 7-element FIR embodiment of filter 1012 is approximately three television frame intervals. Timing control 1314 associated with filter 1014 is identical to timing control 1312, and causes concurrent switching (switching at corresponding frame and line number). This timing operation allows filters 1012 and 1014 to be placed in-circuit immediately after a switching of decimating modes, to reduce the effect of ghosts, and to be taken out of circuit once the ghost reduction has been accomplished, in order to eliminate the double filtering effect described above, thereby maintaining high image resolution at the receiver.

Figure 14:
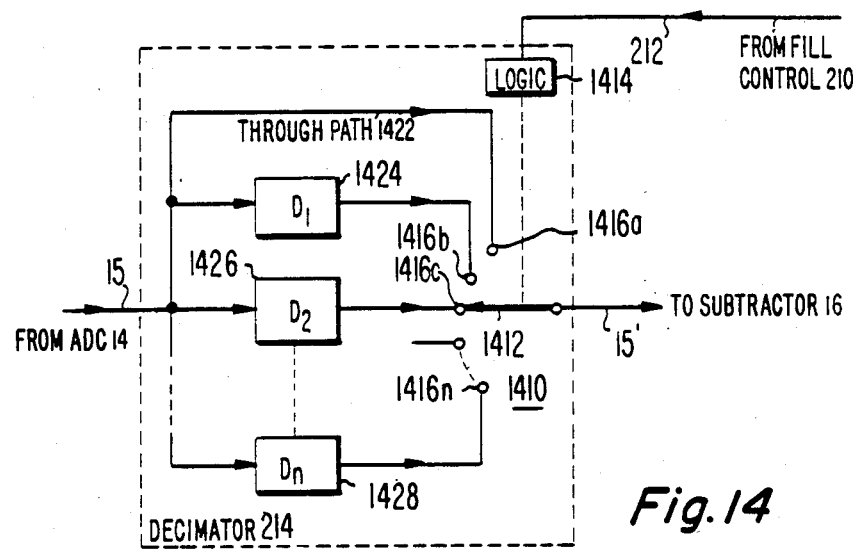
FIG. 14 is a simplified block diagram of a reducer or decimator useful in the arrangements of FIGS. 6, 8, 10 and 13.

FIG. 14 is a simplified block diagram of switchable decimator or data reducer 214 (or 514, or 564) illustrated in FIGS. 6, 8, 10 and 13. In FIG. 14, decimator 214 includes a multiplex switch which is actually implemented in the form of an array of independent solid-state gates but which is illustrated as a mechanical switch designated generally as 1410. Hereinafter, all multiplex switches are illustrated as mechanical equivalents, whatever their actual form. Multiplex switch 1410 includes a controllable wiper 1412, the position of which is controlled by a logic circuit 1414. Wiper 1412 can be set by logic circuit 1414 to couple any one of a plurality of terminals 1416a, 1416b, 1416c . . . 1416n to output conductor 15'. Input conductor 15 is coupled to each of terminals 1416 by a separate path. The path between conductor 15 and switch terminal 1416a is by way of a through path designated 1422, which is a nondecimating path. A second path extends between conductor 15 and switch terminal 1416b by way of a first fixed decimator 1424, which is designated D1 to represent one value of decimation. A path between input conductor 15 and switch terminal 1416c is by way of a second fixed decimator 1426, labeled D2 to indicate that it has a different decimation or sample rate conversion than decimator 1424. In a similar manner, various other paths between conductor 15 and switch terminals 1416 are provided, including a further decimator 1428 denominated $D_n$ which is connected to switch terminal 1416n. In operation, logic circuit 1414 receives fill control signals over conductor 212. The fill control signals may be digital signals representing, by a digital number, one of a plurality N of "bins" or quantized levels in which the amount of lading of rate buffer 28 (not illustrated in FIG. 14) currently resides. For such digital fill control signals, logic circuit 1414 performs a one-of-N conversion or decoding in order to control the position of wiper 1412, which selects the appropriate through path or decimator for the fill condition indicated by the fill control signal. A simple control scheme might choose through path 1422 so long as the fill control signal indicates that rate buffer 28 is less than half full, a 5:4 decimation path when the rate buffer is ¾ full, 4:3 at ⅞ full, and 2:1 at 15/16 full. It should be noted that the decoding function of logic circuit 1414 could be performed in fill control circuit 210, in which case the signals applied by conductor 212 to decimator 214 would already be decoded, and logic circuit 1414 could be dispensed with.

Figure 15:
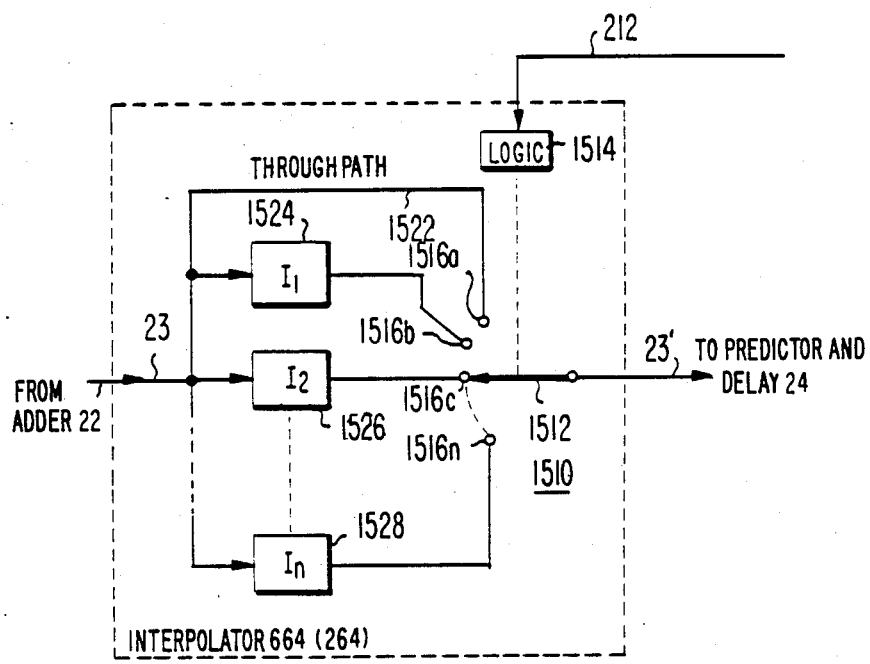
FIG. 15 is a simplified block diagram of a selectable interpolator, data density or data rate increaser useful in the arrangements of FIGS. 6, 8, 10 and 13.

FIG. 15 is a simplified block diagram of interpolators 664 of FIGS. 6, 8, 10 and 13. Interpolator 264 is identical. The structure of interpolator 664 as illustrated in FIG. 15 is very similar to the structure of decimator or density reducer 214 as illustrated in FIG. 14. This is not surprising, considering that a corresponding function is desired. In FIG. 15, a multiplex switch designated as 1510 includes a moving wiper or contact 1512, the position of which is controlled by a logic circuit 1514 which is coupled to receive fill control signals over conductor 212. Logic circuit 1514 performs one-of-N conversion or decoding (if appropriate) in response to the fill condition, and sets wiper 1512 in contact with one of switch terminals 1516a, 1516b, 1516c . . . 1516n. An input conductor 23 is common to a number of paths, each of which terminates at a switch terminal 1516. A first path is a through path designated 1522 which terminates at switch terminal 1516a. A first fixed interpolator or density increaser ($I_1$) designated 1524 is coupled between conductor 1523 and switch terminal 1516b. Similarly, a further plurality of interpolators having different interpolation functions is designated 1526 . . . 1528 and is coupled to switch terminals 1516c . . . 1516n. Each of interpolators 1526 . . . 1528 has an interpolation function $I_1 \ldots I_n$ which is the inverse of the decimation functions $D_1 \ldots D_n$ of decimators 1424–1428. Logic circuits 1414 and 1514 are similarly structured so as to select corresponding decimation and interpolation functions for the same control signal conditions, or for the corresponding control signal from receiver state control 682, in the case of interpolator 264 and decimator 564.

Figure 16:
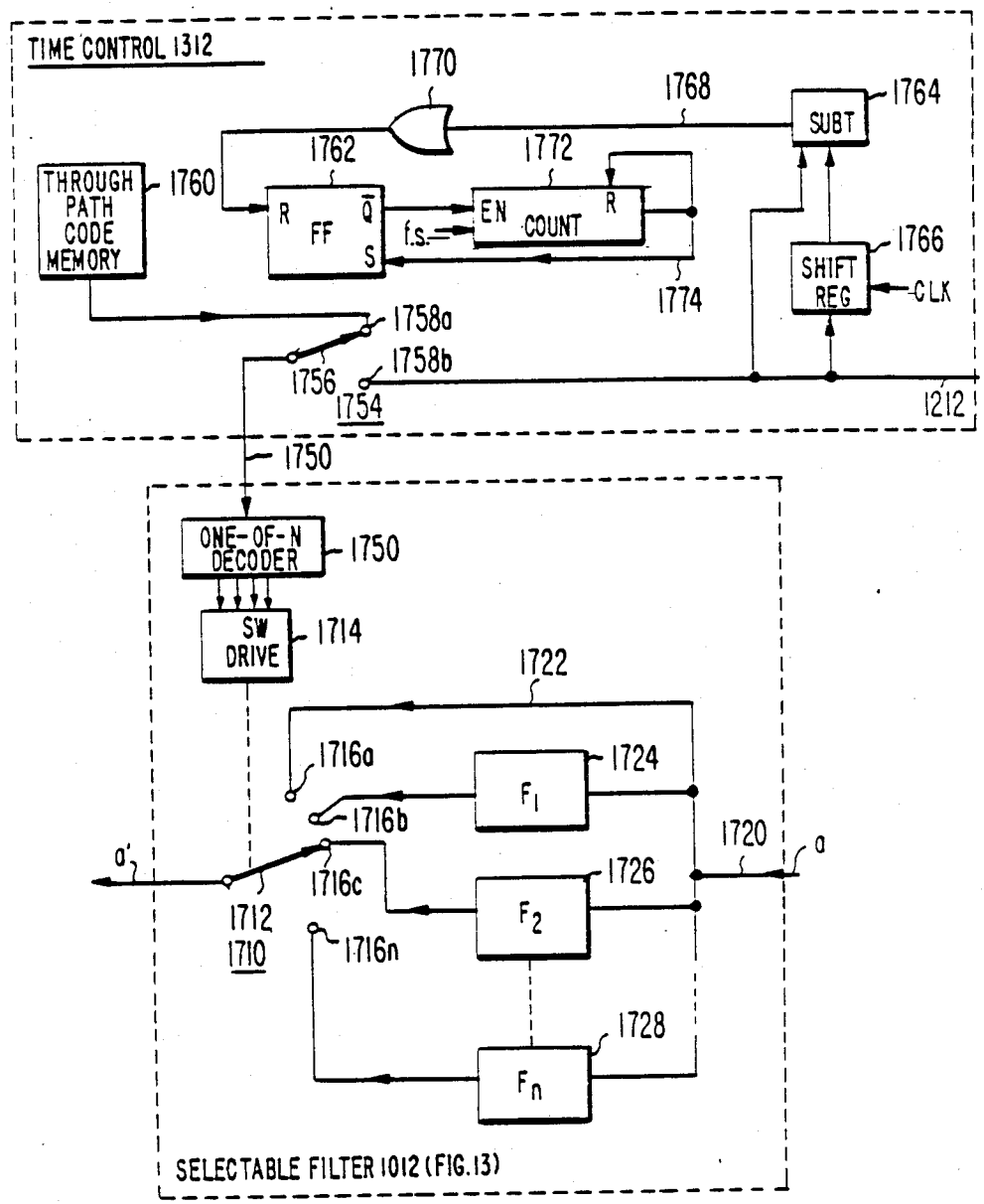
FIG. 16 is a simplified block diagram of a selectable filter useful in the arrangement of FIG. 13

FIG. 16 is a simplified block diagram of selectable filter 1012 of FIG. 13, together with time control 1312. These are identical to filter 1014 and time control 1314 of FIG. 13. In FIG. 16, selectable filter 1012 includes a multiplex switch designated generally as 1710 with a movable wiper 1712 controllable by a switch drive circuit 1714 which is adapted to connect movable wiper 1712 to one of a plurality of terminals 1716a, 1716b, 1716c . . . 1716n. Movable wiper 1712 is continuously connected to conductor a' of FIG. 13. A common input conductor 1720 is connected to the conductor designated a and to each of terminals 1716a . . . 1716n by a separate path. A through path between conductor 1720 and terminal 1716a is designated 1722. A first fixed low-pass filter 1724 having filter function $F_1$ is connected between common conductor 1720 and a second switch terminal 1716b. Similarly, a plurality of further fixed filters 1726 . . . 1728 with filter functions $F_2 \ldots F_n$ is connected between conductor 1720 and terminals 1716c . . . 1716n. Each of filters $F_1 \ldots F_n$ has a filtering characteristic selected in conjunction with the corresponding filtering characteristic of selectable filter 812 so as to substantially eliminate the above-mentioned ghosting. A one-of-N decoder 1750 decodes the control signal applied thereto over a conductor 1752 from a multiplex switch 1754, which is part of time control 1312. Multiplex switch 1754 includes a wiper 1756 coupled to conductor 1752, and also includes terminals 1758a and 1758b connected to a through path code memory 1760 and to conductor 212, respectively. Terminal 1258b receives fill control signal from fill control unit 210 over conductor 212. The position of wiper 1756 of multiplex switch 1754 is controlled by a flip-flop (FF) 1762. FF 1762 is normally in a set condition, which holds movable wiper 1756 in contact with terminal 1758a, for coupling a through path code from a memory 1760 to one-of-N decoder 1750. One-of-N decoder 1750 responds to the through path code to set wiper 1712 of multiplex switch 1710 in contact with conductor 1716a, thereby setting selectable filter 1012 into the through path state. Thus, the normal condition of selectable filter 1012 is the through condition. Fill control circuit 210 can be configured to issue one of N numbers which denote which of N portions of the rate buffer the current occupancy or fill resides. Therefore, the fill control signal can take on any one of N values depicting the fill level. Since one of the N numbers issued by fill control 210 is the through path code, decoder 1750 needs to decode only N (not N+1) numbers. This fill control signal applied from fill control circuit 212 on conductor 973 is applied directly to an input terminal of a subtractor 1764 and through a shift register 1766 to a second input of subtractor 1764. Shift register 1766 delays the control signal applied to the second input terminal of subtractor 1266 from conductor 973 for one clock cycle. So long as the control signal on conductor 212 remains unchanged from clock cycle to clock cycle, the same signal is applied to both input terminals of subtractor 1764, and subtractor 1764 produces zero magnitude signal on output conductor 1768. The clock cycle may be pixel to pixel, scan line to scan line, or frame to frame depending on the design criteria. Any time a change occurs in the control signal on conductor 212, differing signals are momentarily applied to the inputs of subtractor 1764, which responds with a nonzero value. The nonzero value at the output of the subtractor 1764 is applied by conductor 1768 to an OR gate 1770 for Oring together all the bits. The output of OR gate 1770 is applied to the reset (R) input terminals of FF 1762. FF 1762 responds with a transition which (a) throws wiper 1756 of switch 1754 into contact with terminal 1758b, and (b) generates a signal at its $\overline{Q}$ output which is applied to the enable (EN) input terminal of a counter 1772, which also receives frame sync (f.s.) signals at an input, whereby counter 1772 begins counting frame synchronization signals. Until such time as counter 1772 reaches full count, fill control signals are applied from conductor 212 to one-of-N decoder 1750, which responds by switching wiper 1712 of switch 1710 into contact with the appropriate one of terminals 1716b . . . 1716n, for selecting one of filter characteristics $F_1 \ldots F_n$. When counter 1772 reaches the desired count, as for example the aforementioned count of three frame sync intervals, counter 1772 produces an output signal on a conductor 1774 which resets counter 1772 to zero count, and which is also applied to the set (S) input terminal of FF 1762 to return it to the set condition. When FF 1762 returns to the set condition, wiper 1756 returns to contact with terminal 1758a, once again applying through path code to one-of-N decoder 1750, which operates wiper 1712 to contact terminal 1716a for selecting the through path. Thus, a transition in the control signal on conductor 212 resets FF 1762, allowing the control signal to be applied to one-of-N decoder 1750, which sets wiper 1712 to the appropriate filtering condition. After the desired number of frame intervals expire, FF 1762 is set, returning multiplex switch 1754 to a state in which it passes a through code memory to decoder 1750, which responds by setting multiplex switch 1710 to the through position. Naturally, selectable filter 1012 of FIG. 16 can be used in the arrangement of FIG. 10 without time control 1312.

Other embodiments of the invention will be apparent to those skilled in the art. For example, many of the functions described may be performed by other analog or digital embodiments. The "bins" into which the lading of rate buffer 28 is quantized for purposes of feedback control may be of equal sizes, or they may be unequal in size. Filters described as using multiplex switches to switch among a plurality of fixed characteristic filters may instead be single filters with selectable weighting functions. Similarly, decimators and interpolators, described as using multiplex switches to switch among a plurality of fixed characteritistic decimator and inpolators may instead be single units which can be internally re-configured by logic to perform the desired decimation and interpolation. While the communication system has been described as having one receiver and one transmitter, it should be clear that multiple receivers may be used for each transmitter. Also, channel 30 may include modulators and demodulators for transmitting the signals by modulated light over fiber-optic cables, by terrestrial microwave links, via satellite transmissions, over coaxial cable etc. The data may be encoded with cyclic redundancy codes or other codes for error detection or correction. In the arrangements of FIGS. 10 and 13, it is not necessary that filters 1012 and 1014 be switched into filtering operation when the mode is changed from a decimating mode to a nondecimating mode, or to a mode of lesser decimation;

thus when the rate buffer is well emptied, the amount of decimation may be reduced and the bandwidth of filter 812 may be increased while leaving filters 1012 and 1014 in the "through" mode. As illustrated and described, quantizer 18 produces a single output signal which is applied to both adder 22 and coder 23, but it may be configured in known fashion to produce two different but related output signals each of which is applied to either the adder or the coder.

What is claimed is:

1. A method for differential pulse code modulation of frame sequential television signals representing an image, comprising the steps of:
    subtracting delayed predicted signals from said television signals to produce difference signals;
    decimating said television signals, thereby causing a data density difference at said subtracting step;
    decimating said delayed predicted signals to eliminate said data density difference at said subtracting step, whereby said delayed predicted signals as used in said subtracting step are decimated delayed predicted signals;
    adding together said decimated delayed predicted signals and said difference signals to produce current predicted signals, whereby a data density difference exists between said current and delayed predicted signals;
    interpolating said current predicted signals to produce interpolated current predicted signals having a data density equal to that of said delayed predicted signals; and
    at least delaying said interpolated current predicted signals to produce said delayed predicted signals.

2. A method according to claim 1 wherein said at least delaying step includes the step of delaying said interpolated current predicted signal by one frame interval.

3. A method according to claim 1 further comprising the steps of:
    coding said difference signals to produce coded signals in a manner which results, as a function of the image which said television signals represent, in changes from time to time in the rate of data flow of said coded signals;
    storing said coded signals in a buffer as they are generated to form buffered coded signals;
    transmitting said buffered coded signals at a constant rate, whereby said buffer may from time to time tend to approach an extreme of lading;
    generating a control signal representing the need to increase or decrease the flow of said coded signals to said buffer to prevent said extreme of lading; and
    controlling, by the use of said control signal, said step of decimating said television signals, thereby controlling said flow of said coded signals to said buffer in a manner tending to maintain the lading of said buffer between maximum and minimum extremes 4. A method according to claim 1 further comprising the steps of:
    coding said difference signals to produce coded signals in a manner which results, as a function of the image which said television signals represent, in changes from time to time in the rate of data flow of said coded signals;
    storing said coded signals in a buffer as they are generated to form buffered coded signals;
    transmitting said buffered coded signals at a constant rate, whereby said buffer may from time to time tend to approach an extreme of lading;
    generating a control signal representing the need to increase or decrease the flow of said coded signals to said buffer to prevent said extreme of lading; and
    controlling, by the use of said control signal, said step of decimating said delayed predicted signals.

5. A method according to claim 1 further comprising the steps of:
    coding said difference signals to produce coded signals in a manner which results, as a function of the image which said television signals represent, in changes from time to time in the rate of data flow of said coded signals;
    storing said coded signals in a buffer as they are generated to form buffered coded signals;
    transmitting said buffered coded signals at a constant rate, whereby said buffer may from time to time tend to approach an extreme of lading;
    generating a control signal representing the need to increase or decrease the flow of said coded signals to said buffer to prevent said extreme of lading; and
    controlling, by use of said control signal, said step of interpolating said current predicted signals.

6. A method according to claim 1 further comprising the step of filtering said television signals before said step of decimating said television signals to reduce the resolution of the image represented by said television signals.

7. A method according to claim 6 further comprising the step of filtering said delayed predicted signals before said step of decimating said delayed predicted signals to correspondingly reduce the resolution of said delayed predicted signals and of said decimated delayed predicted signals.

8. A method according to claim 3 further comprising the step of filtering said television signals before said step of decimating said television signals to reduce the resolution of the image represented by said television signals.

9. A method according to claim 8 further comprising the step of filtering said delayed predicted signals before said step of decimating said delayed predicted signals to correspondingly reduce the resolution of said delayed predicted signals.

10. A method according to claim 9 further comprising the step of controlling said filtering of said television signals in response to said control signal for reducing the visibility of artifacts resulting from said step of decimating said television signals.

11. A method according to claim 10 further comprising the step of controlling, in response to said control signal, said step of filtering said delayed predicted signals.

12. A method according to claim 11 wherein said step of controlling, in response to said control signal, said filtering of said delayed predicted signals comprises the further step of disabling said filtering of said delayed predicted signals beginning at a predetermined time following a change in said step of controlling said filtering of said television signals.

13. a differential pulse code modulation apparatus for differential pulse code modulation of frame-sequential signals, comprising:
    controllable first decimating means coupled to receive said frame-sequential signals for producing decimated input signals having a data density less than that of said frame-sequential signals by a predetermined amount;

a subtractor for subtracting decimated delayed predicted signals from said decimated input signals for producing difference signals;

an adder including first and second input terminals, said first input terminal of said adder being adapted for receiving said decimated delayed predicted signals, and said second input terminal of said adder being coupled to said subtractor for receiving said difference signals, and for adding said difference signals to said decimated delayed predicted signals to produce current predicted signals;

data density increasing means coupled to said adder for receiving said current predicted signals for increasing the data density of said current predicted signals by the inverse of said predetermined amount to produce densified current predicted signals;

prediction means coupled to said data density increasing means for at least delaying said densified current predicted signals for generating dense delayed predicted signals; and second decimating means coupled to said prediction means, to said subtractor and to said adder for decimating said dense delayed predicted signals for producing said decimated delayed predicted signals, and for coupling said decimated delayed predicted signals to said subtractor and to said adder.

14. Apparatus according to claim 13 wherein said prediction means comprises at least frame delay means for delaying said densified current predicted signal for one frame interval of said frame-sequential signal.

15. Apparatus according to claim 13 further comprising:

coding means coupled to said subtractor for producing coded signals from said difference signals, which coded signals, as a result of changes from time to time in the information which said difference signals represent, have a variable rate;

rate buffer means coupled to said coding means for accepting said coded signals at said variable rate for temporarily storing said coded signals and for transmitting said coded signals at a constant rate, said rate buffer means having a maximum capacity, whereby said variable data rate may undesirably tend to result in a lading of said rate buffer means at an extreme of said capacity of said rate buffer means;

control means coupled to said rate buffer means and to said first decimating means for generating a control signal in response to the lading condition of said rate buffer means, and for controlling said first decimating means in response to said control signal in a manner tending to maintain the lading of said rate buffer means between maximum and minimum extremes of lading.

16. Apparatus according to claim 15 wherein said frame sequential signals comprise television signals, and further comprising first filtering means coupled to an input terminal of said first decimating means for filtering said television signals coupled to said first decimating means for reducing the resolution of the image represented by said television signal.

17. Apparatus according to claim 16 further comprising:

second filtering means coupled to said prediction means and to said second decimating means for filtering said dense delayed predicted signals and for applying filtered dense delayed predicted signals to said second decimating means.

18. Apparatus according to claim 16 further comprising:

first coupling means coupled to said control means and to said first filtering means for coupling said control signal thereto for controlling the filtering of said frame-sequential television signals in response to said control signal for reducing the visibility of artifacts resulting from the action of said first decimating means.

19. Apparatus according to claim 17 further comprising:

first coupling means coupled to said control means and to said first filtering means for coupling said control signal thereto for controlling the filtering of said frame-sequential television signals in response to said control signal for reducing the visibility of artifacts resulting from the action of said first decimating means; and second coupling means coupled to said control means and to second filtering means for coupling said control signal thereto for controlling the filtering of said dense delayed predicted signals in response to said control signal.

20. Apparatus according to claim 19 wherein said second coupling means further comprises:

timing means for changing the filtering condition of said second filtering means at a predetermined time after a previous change in said filtering condition.

21. Apparatus according to claim 13 wherein said frame-sequential signals comprise television signals, and further comprising:

first filtering means coupled to an input terminal of said first decimating means for filtering said television signals coupled to said first decimating means for reducing the resolution of the image represented by said television signal.

22. Apparatus according to claim 21 further comprising:

second filtering means coupled to said prediction means and to said second decimating means for filtering said dense delayed predicted signals to reduce the resolution of the image represented by said dense delayed predicted signals.

23. A communication system for frame sequential signals, said system including at least one data transmitter and one signal receiver, and a signal channel extending therebetween which includes transmitting and receiving ends, said transmitter comprising:

controllable first decimating means coupled to receive said frame sequential signals for producing decimated input signals having a data density less than that of said frame sequential signals by a predetermined amount;

a subtractor coupled to said transmitting end of said signal channel for subtracting decimated delayed predicted signals from said decimated input signals for producing difference signals;

a first adder including first and second input terminals, said first input terminal of said first adder being adapted for receiving said decimated delayed predicted signals, and said second input terminal of said first adder being coupled to said subtractor for receiving said difference signals, for adding said difference signals to said decimated delayed predicted signals for producing current predicted signals;

first data density increasing means coupled to said first adder for receiving said current predicted signals for increasing the data density of said current predicted signals by the inverse of said predetermined amount for producing densified current predicted signals;

first prediction means coupled to said first data density increasing means for at least delaying said densified current predicted signals for producing dense delayed predicted signals; and second decimating means coupled to said prediction means, to said subtractor and to said adder for decimating said dense delayed predicted signals for producing said decimated delayed predicted signals, and for coupling said decimated delayed predicted signals to said subtractor and to said adder; and said receiver comprising:

a second adder coupled to said receiving end of said channel to receive said difference signals for adding said difference signals to regenerated decimated delayed predicted signals to produce regenerated current predicted signals;

second data density increasing means coupled to said second adder for receiving said regenerated current predicted signals for increasing the data density of said regenerated current predicted signals by said inverse of said predetermined amount for producing regenerated densified current predicted signals;

second prediction means coupled to said second data density increasing means for at least delaying said regenerated densified current predicted signals for producing regenerated dense delayed predicted signals;

third decimating means coupled to said second prediction means and to said second adder for receiving said regenerated dense delayed predicted signals for decimating said regenerated dense delayed predicted signals for producing said regenerated decimated delayed predicted signals, and for coupling said regenerated decimated delayed predicted signals to said second adder; and coupling means coupled to one of said second adder and said second data density increasing means and adapted for coupling to utilization means one of said regenerated predicted signals and said regenerated densified current predicted signals.

24. A system according to claim 23 wherein said frame-sequential signals comprise television signals, and wherein said first and second prediction means each comprise means for delaying signal applied thereto by one television frame interval.

25. A receiver for selectively decimated differential pulse code modulated signals, wherein one of the decimations which may be selected is nondecimation, comprising:

rate buffer means adapted for receiving said selectively decimated differential pulse code modulated signals and for coupling them at a variable rate to an output terminal;

decoder means coupled to said output terminal of said rate buffer means for receiving said selectively decimated differential pulse code modulated signals and for decoding them into selectively decimated difference signals;

adding means coupled to said decoder means for receiving said selectively decimated difference signals for adding them to selectively decimated delayed predicted signals to produce selectively decimated predicted signals;

interpolating means coupled to said adding means for selectively interpolating said selectively decimated predicted signals to produce restored data rate predicted signals;

prediction means coupled to said interpolating means for at least delaying said restored data rate predicted signals for generating restored data rate delayed predicted signals;

decimation means coupled to said prediction means and to said adding means for receiving said restored data rate delayed predicted signals for producing said selectively decimated delayed predicted signals; and coupling means coupled to said interpolating means and adapted to be coupled to utilization means for coupling to said utilization means one of said selectively decimated predicted signals and said restored data rate predicted signals.

26. A differential pulse code signal modulation arrangement, comprising;

first switchable filter means adapted for receiving an input signal for selectively filtering said input signal with at least two different bandwidths and for switching between said two different bandwidths, for generating filtered input signals, wherein one of said bandwidths may nominally be infinite;

subtraction means coupled to said first switchable filter means for receiving said filtered input signals, for subtracting filtered delayed predicted signals from said filtered input signals for producing difference signals;

adding means coupled to said subtraction means for adding said difference signals to said filtered delayed predicted signals for generating current predicted signals;

prediction means coupled to said adding means for at least delaying said current predicted signals to produce delayed predicted signals;

second switchable filter means coupled to said prediction means, said subtracting means and said adding means for selectively filtering said predicted signals with at least two different bandwidths, one of which may nominally be infinite, for producing said filtered delayed predicted signals and for coupling said filtered delayed predicted signals to said subtracting means and to said adding means; and timing means coupled to said first and second switchable filter means for setting said second switchable filter means to a predetermined one of said at least two different bandwidths beginning at a predetermined time after at least some of those times at which said first switchable filter means switches between two different bandwidths.

* * * * *